(12) United States Patent
Kubota et al.

(10) Patent No.: US 10,698,176 B2
(45) Date of Patent: Jun. 30, 2020

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Hisao Fukaya, Tochigi (JP)

(73) Assignee: KANTATSU CO., LTD., Tokyo (JP)

( * ) Notice: Subject to any disclaimer, the term of this patent is extended or adjusted under 35 U.S.C. 154(b) by 156 days.

(21) Appl. No.: 15/889,441

(22) Filed: Feb. 6, 2018

(65) Prior Publication Data
US 2018/0246295 A1    Aug. 30, 2018

(30) Foreign Application Priority Data

Feb. 27, 2017 (JP) .................................. 2017-034330

(51) Int. Cl.
*G02B 9/58* (2006.01)
*G02B 13/00* (2006.01)
*G02B 27/00* (2006.01)

(52) U.S. Cl.
CPC .............. *G02B 9/58* (2013.01); *G02B 13/004* (2013.01); *G02B 27/0025* (2013.01)

(58) Field of Classification Search
CPC ...... G02B 13/002; G02B 13/004; G02B 9/34; G02B 9/58; G02B 27/0025
USPC ........................................ 359/715, 781, 782
See application file for complete search history.

(56) References Cited

U.S. PATENT DOCUMENTS

| 2012/0176527 A1* | 7/2012 | Chen .................... G02B 13/004 348/340 |
| 2012/0250165 A1 | 10/2012 | Do |
| 2014/0098432 A1* | 4/2014 | Kubota ............... G02B 13/004 359/781 |

FOREIGN PATENT DOCUMENTS

| JP | H05-264895 A | 10/1993 |
| JP | H06-273670 A | 9/1994 |
| JP | 2011-145665 A | 7/2011 |
| JP | 2016-194604 A | 11/2016 |

OTHER PUBLICATIONS

Notice of Rejection for the patent application No. JP2017-034330 issued by JPO dated Dec. 28, 2018.

* cited by examiner

*Primary Examiner* — Marin Pichler
(74) *Attorney, Agent, or Firm* — Kubotera & Associates, LLC

(57) ABSTRACT

An imaging lens includes a first lens group; and a second lens group, arranged from an object side to an image plane side. The first lens group includes a first lens having negative refractive power and a second lens. The second lens group includes a third lens having positive refractive power and a fourth lens having negative refractive power. The fourth lens is formed in a shape so that a curvature radius of a surface thereof on the image plane side is positive. The first lens, the second lens and the third lens have specific Abbe's numbers, the first lens is arranged to be away from the second lens, the second lens is arranged to be away from the third lens, and the third lens is arranged to be away from the fourth lens by specific distances on an optical axis so that the specific conditional expressions are satisfied.

9 Claims, 21 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a smartphone and a cellular phone, a digital camera, an infrared camera, a digital video camera, an onboard camera, a network camera, a TV conference camera, a fiberscope, and a capsule endoscope.

In these years, some vehicles are equipped with a plurality of cameras for improving convenience and/or security. For example, in case of a vehicle equipped with a backup camera, a driver can see the view behind the vehicle on a display upon backing up. Therefore, the driver can safely move the car backward without hitting any objects including the ones invisible by the driver from inside. Such camera for mounting in a vehicle, so-called "onboard camera", is expected to be continuously in more demand.

Such onboard cameras are often mounted in relatively small spaces, such as a back door, a front grille, a side mirror, and interior space thereof. For this reason, an imaging lens for mounting in an onboard camera is required to have a compact size. Further, the imaging lens for an onboard camera is required to attain high resolution suitable for higher pixel count of an imaging element and a wide angle of view to achieve a wider range of an image. However, it is difficult to attain a wider angle of view, as well as satisfying the requirements of smaller size and higher resolution, while satisfactorily correcting aberrations. For example, when downsizing of an imaging lens is attempted, refractive power of each lens tends to be strong, so that it is difficult to satisfactorily correct aberrations. Upon actual designing of an imaging lens, it is a key to achieve those requirements in a balanced manner.

For example, as the conventional imaging lens having a wide angle of view, an imaging lens described in Patent Reference has been known.

Patent Reference: Japanese Patent Application Publication No. 2011-145665

The conventional imaging lens includes a first lens, a second lens, a third lens, and a fourth lens. The first lens is negative and has a shape of a meniscus shape, directing a convex surface thereof to an object side. The second lens is positive and has a shape of a meniscus shape, directing a concave surface thereof to the object side. The third lens is positive. The fourth lens is positive. According to the conventional imaging lens, the second lens is made of a material having an Abbe's number between 23 and 40. The third lens is made of a material having an Abbe's number between 50 and 85. In addition, according to the conventional imaging lens, a ratio (f/D) of a focal length f of a whole lens system and a distance D from an incident surface on an object side to an image-forming surface is restrained in a certain range. As a result, it is achievable to attain a wider angle and downsizing of the imaging lens as well as satisfactory correction of a chromatic aberration.

Demands for an imaging lens with a wide angle of view become more and more various each year. Especially in these years, there are higher demands for cameras that enable users to take images of objects even in the dark. Therefore, in case of an imaging lens for mounting in a camera like this, it is necessary to ensure the imaging lens to have satisfactory optical performance in the dark. In order to take an image of an object in the dark, for example, it is necessary to irradiate near-infrared light to the object from the camera and take an image of the reflected light. However, the wavelengths of near-infrared light beams are longer than those of visible light beams. For this reason, in a case of general wide-angle lenses, a focal position of near-infrared light significantly changes relative to that of visible light in the dark and it is difficult to form an image of the object on an imaging element. Therefore, in case of an imaging lens for mounting in a camera such as the above, it is necessary to have an image-forming performance at a near-infrared light range as well as at a visible light range.

According to the conventional imaging lens of Patent Reference, although the number of lenses that composes the conventional imaging lens is as small as four, the angle of view is wide and aberrations are relatively satisfactorily corrected. However, in case of conventional imaging lens having wide angles, such as the one described in Patent Reference, it is difficult to achieve satisfactorily image-forming performance over wide wavelength range from that of visible light to that of near-infrared light. As one of solutions for such problem, an optical element may be inserted and removed between an imaging lens and an imaging element so as to adjust a focal length. However, to do so, the imaging lens or the camera has to include a mechanism for inserting/removing the optical element, which is not preferred in view of downsizing of the imaging lens and/or the camera.

Here, such problem is not unique to the imaging lens for mounting in an onboard camera. In case of security cameras, it becomes a "must-have" function to be able to take an image by infrared radiation so as to monitor after sunset. In case of portable devices such as smartphones, night vision cameras which enable users to take images in the dark are sold as an option. In case of digital cameras and digital video cameras, there are already products available in the market, which are equipped with a night vision function. In addition, in case of network cameras, TV conference cameras, and cameras of fiberscopes and capsule endoscopes, there are products available, which have a function of taking images in a near-infrared range. The above-described problems are common among imaging lenses for mounting in relatively small-sized cameras.

In view of the above-described problems in the conventional techniques, an object of the present invention is to provide an imaging lens that can attain a wider angle of view and satisfactory correction of aberrations, while achieving a small size.

Further objects and advantages of the present invention will be apparent from the following description of the invention.

SUMMARY OF THE INVENTION

In order to attain the objects described above, according to a first aspect of the present invention, an imaging lens includes a first lens group and a second lens group, arranged in the order from an object side to an image plane side. The first lens group preferably includes a first lens having negative refractive power and a second lens. On the other hand, the second lens group includes a third lens having positive refractive power, and a fourth lens that has negative refractive power and is formed in a shape such that a curvature radius of a surface thereof on an image plane side is positive. With this configuration, according to a second aspect of the invention, when the first lens has an Abbe's number vd1, the second lens has an Abbe's number vd2, the third lens has an Abbe's number vd3, the whole lens system has the focal length f, a distance along the optical axis between the first lens and the second lens is D12, a distance along the optical axis between the second lens and the third lens is D23, and a distance along the optical axis between the third lens and the fourth lens is D34, the imaging lens of the invention satisfies the following conditional expressions (1) through (5):

$$40 < vd1 < 70 \tag{1}$$

$$40 < vd2 < 70 \tag{2}$$

$$40 < vd3 < 70 \tag{3}$$

$$0.2 < D12/D23 < 1.4 \tag{4}$$

$$0.01 < D34/f < 0.1 \tag{5}$$

When the imaging lens satisfies the conditional expressions (1) through (3), it is achievable to restrain a chromatic aberration within a satisfactory range over a wide wavelength band. As well known, since refractive power of a lens varies depending on a wavelength, a focal position of light beams of each wavelength that pass through the imaging lens also vary. Such differences among the focal positions are recognizable as a chromatic aberration, which causes poor image-forming performance of an imaging lens. In order to obtain satisfactory image-forming performance in a wide range of wavelength from visible light to near-infrared light, it is important to restrain the chromatic aberration. According to the imaging lens of the invention, three lenses of the four arranged on the object side are made of a material having a high Abbe's number, so as to achieve satisfactory correction of an axial chromatic aberration and a chromatic aberration of magnification.

When the value exceeds the upper limit of "70", the axial chromatic aberration is excessively corrected (a focal position at a short wavelength moves to the image plane side relative to that at a reference wavelength). In addition, the chromatic aberration of magnification is excessively corrected (an image-forming point at a short wavelength moves in a direction to be away from the optical axis relative to that at a reference wavelength). Therefore, it is difficult to obtain satisfactory image-forming performance. On the other hand, when the value is below the lower limit of "40", the axial chromatic aberration is insufficiently corrected (a focal position at a short wavelength moves to the object side relative to that at a reference wavelength). In addition, the chromatic aberration of magnification is insufficiently corrected (an image-forming point at a short wavelength moves in a direction to be close to the optical axis relative to that at a reference wavelength). For this reason, it is difficult to obtain satisfactory image-forming performance.

When the imaging lens satisfies the conditional expression (4), it is achievable to restrain a coma aberration, the astigmatism, and a field curvature within satisfactory ranges in a balanced manner. When the value exceeds the upper limit of "1.4", a sagittal image surface in the astigmatism is curved toward the object side. As a result, an image-forming surface is curved toward the object side, so that the field curvature is insufficiently corrected. In addition, an inner coma aberration increases for off-axis light fluxes, so that it is difficult to obtain satisfactory image-forming performance. On the other hand, when the value is below the lower limit of "0.2", in the astigmatism, the sagittal image surface is curved toward the image plane side, and the image-forming surface is curved toward the image plane side. As a result, the field curvature is excessively corrected. In addition, an outer coma aberration increases for off-axis light fluxes, so that it is difficult to obtain satisfactory image-forming performance.

When the imaging lens satisfies the conditional expression (5), it is achievable to satisfactorily correct the chromatic aberration, the distortion, and the astigmatism. When the value exceeds the upper limit of "0.1", it is advantageous for correcting the distortion and the axial chromatic aberration. However, in the astigmatism, the sagittal image surface is curved toward the image plane side and the astigmatic difference increases. Moreover, the chromatic aberration of magnification is insufficiently corrected, so that it is difficult to obtain satisfactory image-forming performance. On the other hand, when the value is below the lower limit of "0.01", it is advantageous for correcting the chromatic aberration of magnification. However, the negative distortion increases. In addition, in the astigmatism, the sagittal image surface is curved toward the object side. In addition, the astigmatic difference increases and the field curvature is insufficiently corrected. For this reason, it is difficult to obtain satisfactory image-forming performance.

According to a second aspect of the invention, the imaging lens having the above-described configuration preferably further satisfies the following conditional expression (5A) so as to satisfactorily correct the aberrations:

$$0.01 < D34/f < 0.08 \tag{5A}$$

According to the aspect of the present invention, the imaging lens includes a first lens group having negative refractive power and a second lens group, arranged in the order from the object side to the image plane side. The first lens group includes a first lens having negative refractive power and a second lens that is formed in a shape such that a curvature radius of a surface thereof on an image plane side is negative. The second lens group includes a third lens having positive refractive power and a fourth lens that has negative refractive power and is formed in a shape such that a curvature radius on an image plane side is positive. According to a third aspect of the invention, when the whole lens system has the focal length f and a distance along the optical axis between the third lens and the fourth lens is D34, the imaging lens having the above-described configuration preferably satisfies the following conditional expression (5):

$$0.01 < D34/f < 0.1 \tag{5}$$

According to the imaging lens of the invention, the second lens is formed in a shape, such that a curvature radius of a surface thereof on the image plane side is negative, i.e., a shape directing a convex surface thereof to the image plane side near the optical axis. With such shape of the surface of the second lens on the image plane side, it is achievable to suitably restrain generation of the inner coma aberration for off-axis light fluxes.

Moreover, according to the imaging lens of the invention, the first lens group has negative refractive power, so that the arrangement of the refractive power is negative of the first lens group, positive of the third lens, and negative of the fourth lens in the order from the object side. With such negative-positive-negative arrangement, it is achievable to satisfactorily correct the chromatic aberration of magnification, the field curvature, the coma aberration, the astigmatism, and the distortion in a balanced manner. Here, when the first lens group has positive refractive power, it is advantageous for correction of the distortion. However, it is difficult to correct the axial chromatic aberration and the chromatic aberration of magnification. In addition, the outer coma aberration increases and the field curvature is insufficiently corrected. Therefore, it is difficult to obtain satisfactory image-forming performance.

According to a fourth aspect of the invention, when the second lens has a focal length f2, the imaging lens having the above-described configuration preferably satisfies the following conditional expression (6):

$$1.5<f2/f<15 \qquad (6)$$

When the imaging lens satisfies the conditional expression (6), it is achievable to satisfactorily correct the chromatic aberration, the coma aberration, and the distortion, while downsizing the imaging lens. When the value exceeds the upper limit of "15", the negative distortion increases and the axial chromatic aberration and the chromatic aberration of magnification are both excessively corrected. Therefore, it is difficult to obtain satisfactory image-forming performance. Furthermore, it is also difficult to downsize the imaging lens. On the other hand, when the value is below the lower limit of "1.5", it is advantageous for correcting the distortion and downsizing of the imaging lens. However, the chromatic aberration of magnification is insufficiently corrected and the outer coma aberration for off-axis light fluxes increases. For this reason, it is difficult to obtain satisfactory image-forming performance.

According to a fifth aspect of the invention, in order to satisfactorily correct the aberrations, the imaging lens having the above-described configuration preferably further satisfies the following conditional expression (6A):

$$1.5<f2/f<10 \qquad (6A)$$

According to a sixth aspect of the invention, when a thickness of the second lens on the optical axis is T2, the imaging lens preferably satisfies the following conditional expression (7):

$$0.1<T2/f<1.5 \qquad (7)$$

When the imaging lens satisfies the conditional expression (7), it is achievable to satisfactorily correct the chromatic aberration, the astigmatism, and the distortion in a balanced manner. When the value exceeds the upper limit of "1.5", the negative distortion increases and the axial chromatic aberration is excessively corrected. Moreover, the astigmatic difference increases, so that it is difficult to obtain satisfactory image-forming performance. On the other hand, when the value is below the lower limit of "0.1", it is advantageous for correcting the axial chromatic aberration and the distortion. However, the astigmatic difference increases. Therefore, also in this case, it is difficult to obtain satisfactory image-forming performance.

According to a seventh aspect of the invention, when a composite focal length of the first lens and the second lens is f12 and the third lens has a focal length f3, the imaging lens having the above-described configuration preferably satisfies the following conditional expression (8):

$$-15<f12/f3<-1 \qquad (8)$$

When the imaging lens satisfies the conditional expression (8), it is achievable to restrain the chromatic aberration, the field curvature, and the distortion within satisfactory ranges in a balanced manner, while downsizing the imaging lens. When the value exceeds the upper limit of "−1", it is advantageous for correction of the chromatic aberration. However, the negative distortion increases and the field curvature is excessively corrected. Therefore, it is difficult to obtain satisfactory image-forming performance. Furthermore, it is also difficult to downsize the imaging lens. On the other hand, when the value is below the lower limit of "−15", it is advantageous for downsizing of the imaging lens. However, the chromatic aberration of magnification is excessively corrected and the field curvature is insufficiently corrected. Therefore, it is difficult to obtain satisfactory image-forming performance.

According to an eighth aspect of the invention, when the third lens has a focal length f3 and the fourth lens has a focal length f4, the imaging lens having the above-described configuration preferably satisfies the following conditional expression (9):

$$-1<f3/f4<-0.1 \qquad (9)$$

When the imaging satisfies the conditional expression (9), it is achievable to satisfactorily correct the chromatic aberration, the astigmatism, the field curvature, and the distortion, respectively. When the value exceeds the upper limit of "−0.1", the axial chromatic aberration is excessively corrected and the field curvature is excessively corrected. Therefore, it is difficult to obtain satisfactory image-forming performance. When the value is below the lower limit of "−1", the axial chromatic aberration is insufficiently corrected, and the chromatic aberration of magnification is excessively corrected. Therefore, it is difficult to obtain satisfactory image-forming performance.

According to a ninth aspect of the invention, when the whole lens system has a focal length fd at a d line, and a focal length fir at the wavelength of 850 nm, the imaging lens having the above-described configuration preferably satisfies the following conditional expression (10):

$$0.9<fir/fd<1.1 \qquad (10)$$

When the imaging lens satisfies the conditional expression (10), it is achievable to obtain satisfactory image-forming performance in a wide wavelength band. When the value is outside the range of the conditional expression (10), the difference between the focal position for a visible light beam and that for a near-infrared light beam is significant and the image-forming performance is poor when an image is taken with a near-infrared light beam. For this reason, it is difficult to obtain satisfactory image-forming performance in the wide wavelength band.

According to the imaging lens of the invention, the second lens preferably has a positive refractive power. With the positive refractive power of the second lens, the positive refractive power of the whole lens system is shared between the two lenses, i.e., the second lens and the third lens. When the positive refractive power of the whole lens system is shared between two lenses, it is achievable to keep the refractive power of each lens weak than when the positive refractive power of the whole lens system is achieved by one lens. With this configuration, it is achievable to more satisfactorily correct the aberrations. Here, the positive refractive power of the second lens is preferably the weakest among those of the four lenses that compose the imaging lens.

According to the imaging lens having the above-described configuration, it is preferred to have a stop between the second lens and the third lens. Having the stop at a such position, it is achievable to satisfactorily correct the chromatic aberration and the astigmatism, while downsizing the imaging lens. In addition, it is also achievable to restrain an incident angle of a light beam emitted from the imaging lens to an image plane of the imaging element within the range of a chief ray angle (CRA).

When the stop is disposed on the object side relative to the second lens, it is easy to restrain the incident angle within the range of CRA. However, in this case, the size of the lens, which is disposed on the image plane side relative to the stop, will be large, so that it is difficult to downsize the imaging lens. On the other hand, when the stop is disposed on the image plane side relative to the third lens, the incident angle is large and it is difficult to restrain the incident angle within the range of CRA. In addition, the sizes of the lenses disposed on the object side relative to the stop will be large, so that it is difficult to downsize the imaging lens.

According to a tenth aspect of the invention, when the second lens has a thickness T2 on the optical axis, and the third lens has a thickness T3 on the optical axis, the imaging lens having the above-described configuration preferably satisfies the following conditional expression (11):

$$0.1 < T2/T3 < 5.0 \quad (11)$$

When the imaging lens satisfies the conditional expression (11), it is achievable to satisfactorily correct the chromatic aberration, the field curvature, and the astigmatism in a balanced manner. When the value exceeds the upper limit of "5.0", it is advantageous for correction of the chromatic aberration. However, in the astigmatism, the sagittal image surface is curved toward the image plane side. As a result, the astigmatic difference increases and the field curvature is excessively corrected. Therefore, it is difficult to obtain satisfactory image-forming performance. On the other hand, when the value is below the lower limit of "0.1", the axial chromatic aberration is insufficiently corrected and the field curvature is insufficiently corrected. Therefore, it is difficult to obtain satisfactory image-forming performance.

According to an eleventh aspect of the invention, in order to satisfactorily correct the aberrations, the imaging lens having the above-described configuration preferably further satisfies the following conditional expression (11A):

$$0.3 < T2/T3 < 2.5 \quad (11A)$$

According to a twelfth aspect of the invention, when the whole lens system has the focal length f and a distance along the optical axis from an object-side surface of the first lens to an image plane is La, the imaging lens having the above-described configuration preferably satisfies the following conditional expression (12):

$$2.5 < La/f < 5.0 \quad (12)$$

In these years, there is an increasing demand for taking images of a wider range through an imaging lens. In this case, the imaging lens is often required to have both a small size and a wider angle. Especially in case of an imaging lens to be built in a thin portable device, e.g. smartphone, it is necessary to be able to accommodate an imaging lens in a limited space. Therefore, there is often a strict limitation in a length of the imaging lens in a direction of an optical axis. In this point, according to the imaging lens of the invention, when the imaging lens satisfies the conditional expression (12), it is achievable to attain downsizing and a wider angle of view of the imaging lens in a balanced manner. Here, between the imaging lens and the image plane of the imaging element, there is often disposed an insert such as an infrared cut-off filter and a cover glass. In this specification, air conversion length is used for a distance of such insert on the optical axis.

When the imaging lens of the invention has an angle of view 2ω, the imaging lens preferably satisfies 100°≤2ω. When the imaging lens satisfies this conditional expression, the imaging lens can have a wider angle of view, and it is suitably achievable to attain both downsizing and a wider angle of view of the imaging lens.

According to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Therefore, "an object-side surface having a positive curvature radius" means the object-side surface is a convex surface. "An object-side surface having a negative curvature radius" means the object side surface is a concave surface. In addition, "an image plane-side surface having a positive curvature radius" means the image plane-side surface is a concave surface. "An image plane-side surface having a negative curvature radius" means the image plane-side surface is a convex surface. Here, a curvature radius used herein refers to a paraxial curvature radius, and may not fit to general shapes of the lenses in their sectional views all the time.

According to the imaging lens of the invention, it is achievable to provide an imaging lens having a wide angle of view, which is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

Hereunder, referring to the accompanying drawings, an embodiment of the present invention will be fully described.

FIGS. 1, 4, 7, 10, 13, 16, and 19 are schematic sectional views of the imaging lenses in Numerical Data Examples 1 to 7 according to the embodiment, respectively. Since the imaging lenses in those Numerical Data Examples have the same basic configuration, the lens configuration of the embodiment will be described with reference to the illustrative sectional view of Numerical Data Example 1.

According to the embodiment of the invention, the imaging lens includes a first lens group having negative refractive power, an aperture stop, and a second lens group. The first lens group is composed of a first lens and a second lens. The second lens group is composed of a third lens and a fourth lens. When a composite focal length of the first lens and the second lens is f12, the imaging lens of the embodiment satisfies the following conditional expression:

$$f12<0$$

Figure 1:
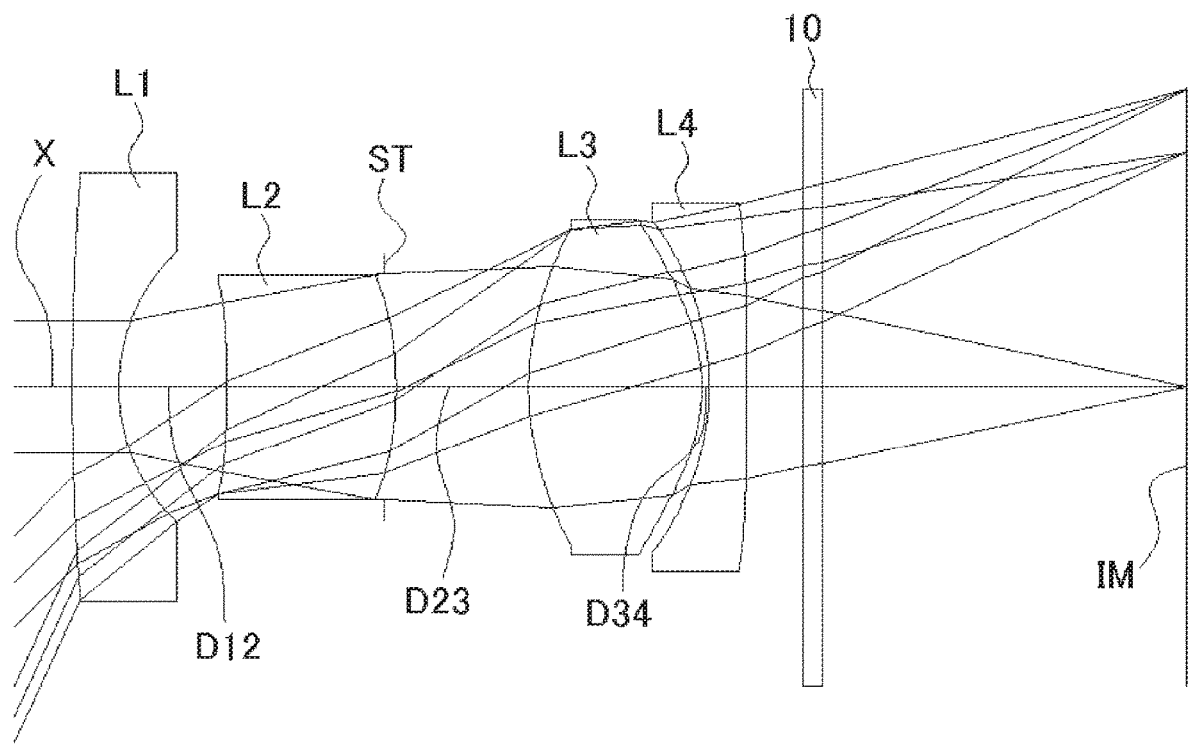
FIG. 1 shows a sectional view of a schematic configuration of an imaging lens in Numerical Data Example 1 of the present invention.

More specifically, as shown in FIG. 1, the imaging lens of the embodiment includes a first lens L1 having negative refractive power, a second lens L2 having positive refractive power, an aperture stop ST, a third lens L3 having positive refractive power, and a fourth lens L4 having negative refractive power, arranged in the order from an object side to an image plane side. Between the fourth lens L4 and an image plane IM of an imaging element, there is provided a filter 10. The filter 10 is omissible.

The first lens L1 is formed in a shape such that a curvature radius r1 of a surface thereof on the object-side and a curvature radius r2 of a surface thereof on the image plane side are both positive, so as to have a shape of a meniscus lens directing a convex surface thereof to the object side near an optical axis X. The shape of the first lens L1 may not be limited to the one in Numerical Data Example 1. The first lens L1 can be formed in any shape, as long as the curvature radius r2 of a surface thereof on the image plane side is positive. Numerical Data Example 6 is an example, in which the first lens L1 is formed in a shape, such that the curvature radius r1 of a surface thereof on the object side is negative, i.e., so as to have a shape of a biconcave lens near the optical axis X.

The second lens L2 is formed in a shape such that a curvature radius r3 of a surface thereof on the object side and a curvature radius r4 of a surface thereof on the image plane side are both negative, so as to have a shape of a meniscus lens directing a concave surface thereof to the object side near the optical axis X. The shape of the second lens L2 is also not limited to the one in Numerical Data Example 1. The second lens L2 can be formed in any shape, as long as the curvature radius r4 of a surface thereof on the image plane side is negative. Numerical Data Examples 3 and 6 are examples, in which the second lens L2 is formed in a shape, such that the curvature radius r3 of a surface thereof on the object side is positive, i.e., so as to have a shape of a biconvex lens near the optical axis X.

The third lens L3 is formed in a shape such that a curvature radius r6 of a surface thereof on the object side is positive and a curvature radius r7 of a surface thereof on the image plane side is negative, so as to have a shape of a biconvex lens near the optical axis X.

The fourth lens L4 is formed in a shape such that a curvature radius r8 of a surface thereof on the object side is negative and a curvature radius r9 of a surface thereof on the image plane side is positive, so as to have a shape of a biconcave lens near the optical axis X.

According to the embodiment, the imaging lens satisfies the following conditional expressions (1) to (12):

$$40<vd1<70 \tag{1}$$

$$40<vd2<70 \tag{2}$$

$$40<vd3<70 \tag{3}$$

$$0.2<D12/D23<1.4 \tag{4}$$

$$0.01<D34/f<0.1 \tag{5}$$

$$0.01<D34/f<0.08 \tag{5A}$$

$$1.5<f2/f<15 \tag{6}$$

$$1.5<f2/f<10 \tag{6A}$$

$$0.1<T2/f<1.5 \tag{7}$$

$$-15<f12/f3<-1 \tag{8}$$

$$-1<f3/f4<-0.1 \tag{9}$$

$$0.9<fir/fd<1.1 \tag{10}$$

$$0.1<T2/T3<5.0 \tag{11}$$

$$0.3<T2/T3<2.5 \tag{11A}$$

$$2.5<La/f<5.0 \tag{12}$$

In the above conditional expressions:
f: Focal length of the whole lens system
fd: Focal length of the whole lens system at a d line
fir: Focal length of the whole lens system at a wavelength of 850 nm
f2: Focal length of the second lens L2
f3: Focal length of the third lens L3
f4: Focal length of the fourth lens L4
T2: Thickness of the second lens L2 along the optical axis X
T3: Thickness of the third lens L3 along the optical axis X
D12: Distance along the optical axis X between the first lens L1 and the second lens L2
D23: Distance along the optical axis X between the second lens L2 and the third lens L3
D34: Distance along the optical axis X between the third lens L3 and the fourth lens L4

La: Distance on the optical axis X from the object-side surface of the first lens L1 to the image plane IM (air conversion length for the filter 10)
vd1: Abbe's number of the first lens L1
vd2: Abbe's number of the second lens L2
vd3: Abbe's number of the third lens L3

Here, it is not necessary to satisfy all of the conditional expressions, and it is achievable to obtain an effect corresponding to the respective conditional expression when any single one of the conditional expressions is individually satisfied.

According to the embodiment, lens surfaces of each of the second lens L2 to the fourth lens L4 are formed as aspheric shapes. The aspheric shapes of the lens surfaces are expressed by the following formula:

$$Z = \frac{C \cdot H^2}{1 + \sqrt{1 - (1+k) \cdot C^2 \cdot H^2}} + \sum (An \cdot H^n) \quad \text{[Formula 1]}$$

In the above conditional expressions:
Z: Distance in a direction of the optical axis
H: Distance from the optical axis in a direction perpendicular to the optical axis
C: Paraxial curvature (=1/r, r: paraxial curvature radius)
k: Conic constant
An: The nth order aspheric coefficient Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index at a d line, nir represents a refractive index at a wavelength of 850 nm, and vd represents an Abbe's number, respectively. Here, aspheric surfaces are indicated with surface numbers i affixed with * (asterisk).

Numerical Data Example 1

Basic Lens Data

TABLE 1

| | i | r | d | nd | nir | vd | [mm] |
|---|---|---|---|---|---|---|---|
| | | f = 3.43 mm Fno = 2.4 ω = 65.0° | | | | | |
| L1 | 1 | ∞ | ∞ | | | | |
| | | 30.000 | 0.500 | 1.5346 | 1.5272 | 56.1 | f1 = −4.051 |
| | 2 | 2.008 | 1.154 | | | | |

TABLE 1-continued

| | i | r | d | nd | nir | vd | [mm] |
|---|---|---|---|---|---|---|---|
| | | f = 3.43 mm Fno = 2.4 ω = 65.0° | | | | | |
| L2 | 3* | −19.627 | 1.816 | 1.5346 | 1.5272 | 56.1 | f2 = 10.361 |
| | 4* | −4.459 | −0.132 | | | | |
| ST | 5 | ∞ | 1.552 | | | | |
| L3 | 6* | 2.968 | 1.859 | 1.5346 | 1.5272 | 56.1 | f3 = 2.625 |
| | 7* | −2.081 | 0.081 | | | | |
| L4 | 8* | −3.110 | 0.397 | 1.6503 | 1.6291 | 21.5 | f4 = −4.555 |
| | 9* | 65.466 | 0.600 | | | | |
| | 10 | ∞ | 0.210 | 1.5168 | | 64.2 | |
| | 11 | ∞ | 3.915 | | | | |
| (IM) | | ∞ | | | | | |

$T2=1.816$ mm $T3=1.859$ mm $D12=1.154$ mm $D23=1.420$ mm $D34=0.081$ mm $fd=3.431$ mm $fir=3.439$ mm $f12=-11.314$ mm $La=11.880$ mm

TABLE 2

| | | Aspherical surface data | | | |
|---|---|---|---|---|---|
| i | k | A4 | A6 | A8 | A10 |
| 3 | 0 | −2.603E−02 | −8.159E−03 | 1.557E−03 | −4.678E−04 |
| 4 | −4.387E+00 | −3.696E−02 | 4.489E−03 | −9.314E−04 | 1.125E−04 |
| 6 | 0 | −1.596E−02 | 2.626E−03 | −2.849E−04 | 4.258E−05 |
| 7 | −1.568E−01 | 6.939E−03 | 1.374E−02 | −3.804E−03 | 4.790E−04 |
| 8 | 0 | −3.116E−02 | 2.349E−02 | −6.777E−03 | 6.236E−04 |
| 9 | 0 | −1.861E−02 | 8.021E−03 | −2.004E−03 | 1.796E−04 |

The values of the respective conditional expressions are as follows:

$D34/f=0.023$ $D12/D23=0.81$ $f2/f=3.02$ $T2/f=0.53$ $f12/f3=-4.31$ $f3/f4=-0.58$ $fir/fd=1.002$ $T2/T3=0.98$ $La/f=3.46$ Accordingly, the imaging lens of Numerical Data Example 1 satisfies the above-described conditional expressions.

Figure 2:
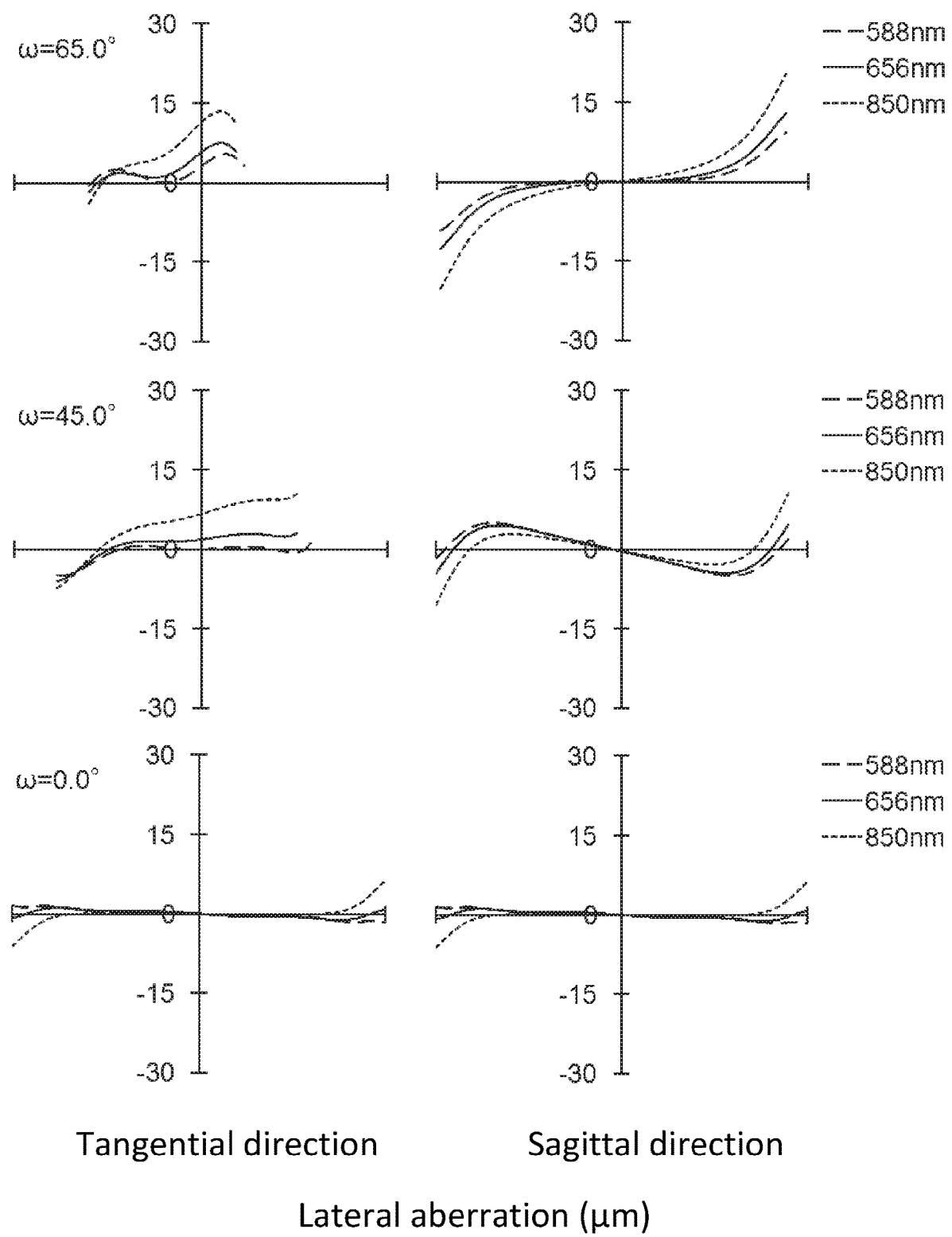
FIG. 2 is an aberration diagram showing a lateral aberration of the imaging lens of FIG. 1.
Figure 3:
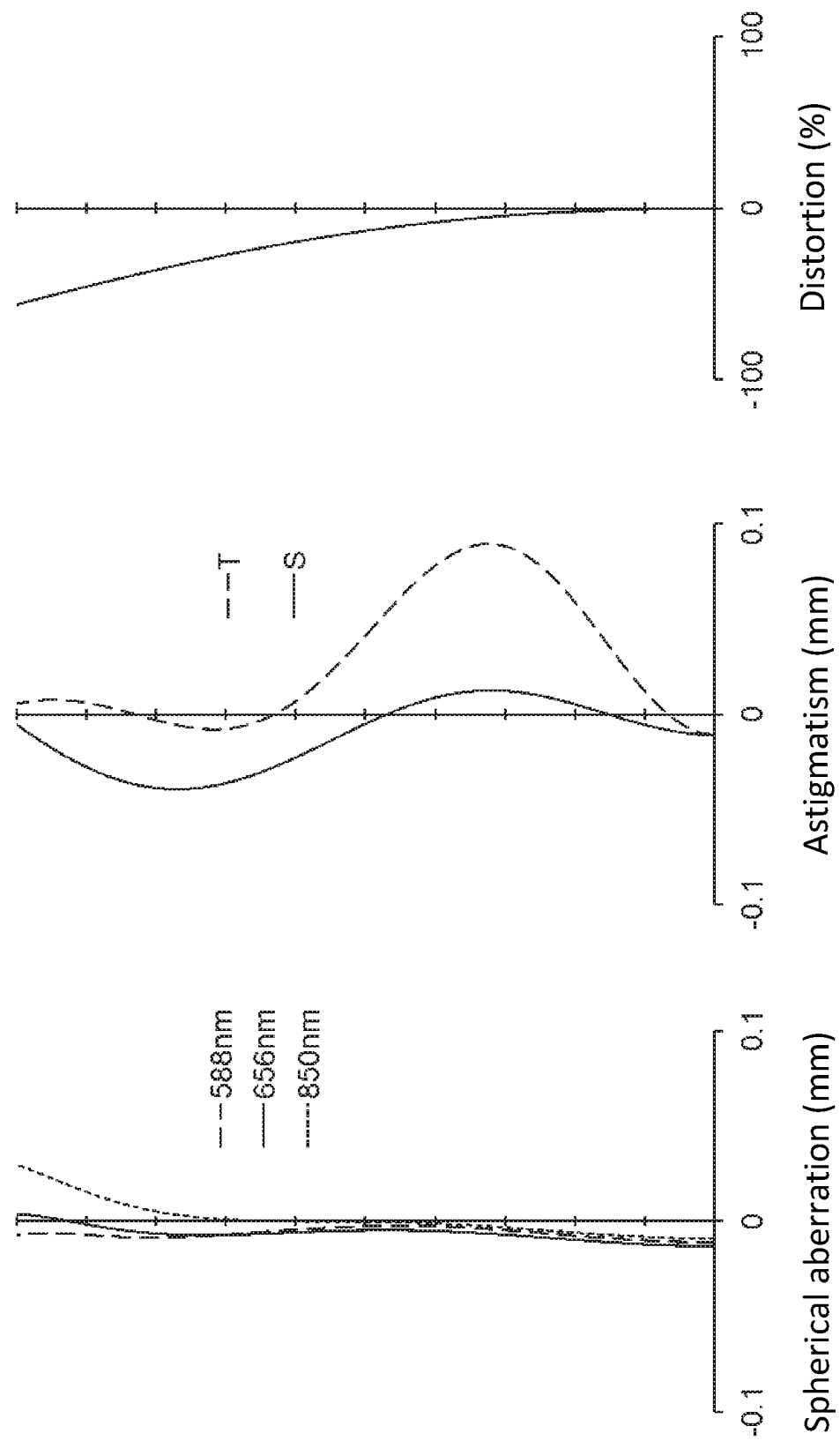
FIG. 3 is an aberration diagram showing a spherical aberration, astigmatism, and a distortion of the imaging lens of FIG. 1.
Figure 4:
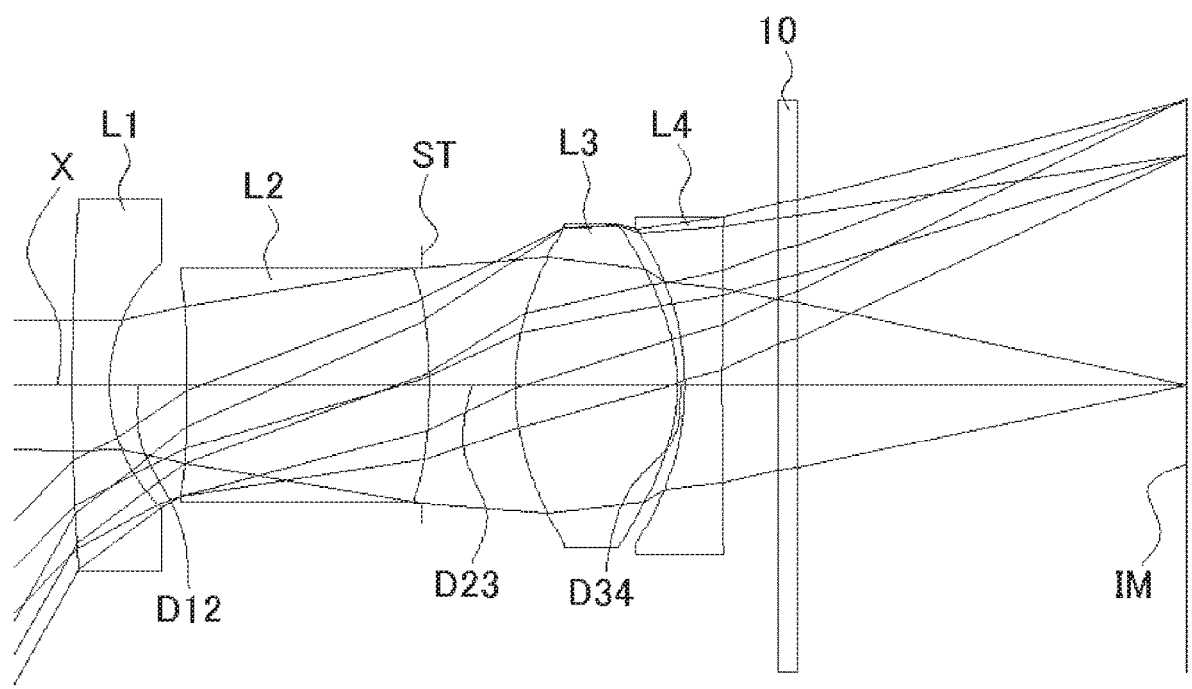
FIG. 4 shows a sectional view of a schematic configuration of an imaging lens in Numerical Data Example 2 of the present invention.

FIG. 2 shows a lateral aberration that corresponds to a half angle of view ω, which is divided into a tangential direction and a sagittal direction (The same is true for FIGS. 5, 8, 11, 14, 17, and 20). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, 18, and 21). As shown in FIGS. 2 and 3, according to the imaging lens of Numerical Data Example 1, the aberrations are satisfactorily corrected.

Numerical Data Example 2

Basic Lens Data

TABLE 3

| | | | f = 3.37 mm Fno = 2.4 ω = 60.6° | | | | |
|---|---|---|---|---|---|---|---|
| | i | r | d | nd | nir | vd | [mm] |
| | | ∞ | ∞ | | | | |
| L1 | 1 | 28.000 | 0.400 | 1.5348 | 1.5274 | 55.7 | f1 = −3.706 |
| | 2 | 1.842 | 0.830 | | | | |
| L2 | 3* | −50.695 | 2.610 | 1.5348 | 1.5274 | 55.7 | f2 = 16.730 |
| | 4* | −7.741 | −0.076 | | | | |
| ST | 5 | ∞ | 0.997 | | | | |
| L3 | 6* | 2.475 | 1.750 | 1.5348 | 1.5274 | 55.7 | f3 = 2.486 |
| | 7* | −2.165 | 0.079 | | | | |
| L4 | 8* | −3.481 | 0.400 | 1.6503 | 1.6291 | 21.5 | f4 = −4.591 |
| | 9* | 21.924 | 0.600 | | | | |
| | 10 | ∞ | 0.210 | 1.5168 | | 64.2 | |
| | 11 | ∞ | 4.194 | | | | |
| (IM) | | ∞ | | | | | |

$T2$=2.610 mm $T3$=1.750 mm $D12$=0.830 mm $D23$=0.921 mm $D34$=0.079 mm $fd$=3.375 mm $fir$=3.382 mm $f12$=−6.051 mm $La$=11.922 mm

TABLE 4

| Aspherical surface data | | | | | |
|---|---|---|---|---|---|
| i | k | A4 | A6 | A8 | A10 |
| 3 | 0 | −2.080E−02 | −1.498E−03 | −1.690E−03 | 3.998E−04 |
| 4 | 2.257E−02 | −3.692E−02 | 1.013E−02 | −3.402E−03 | 7.643E−04 |
| 6 | 0 | −2.456E−02 | 4.517E−03 | −9.884E−04 | 1.009E−04 |
| 7 | −3.293E−01 | 7.163E−03 | 9.160E−03 | −2.902E−03 | 3.874E−04 |
| 8 | 0 | −3.772E−02 | 2.307E−02 | −6.600E−03 | 7.088E−04 |
| 9 | 0 | −2.508E−02 | 1.272E−02 | −2.944E−03 | 2.822E−04 |

The values of the respective conditional expressions are as follows:

$D34/f$=0.023

$D12/D23$=0.90

$f2/f$=4.96

$T2/f$=0.77

$f12/f3$=−2.43

$f3/f4$=−0.54

$fir/fd$=1.002

$T2/T3$=1.49

$La/f$=3.54

Accordingly, the imaging lens of Numerical Data Example 2 satisfies the above-described conditional expressions.

Figure 5:
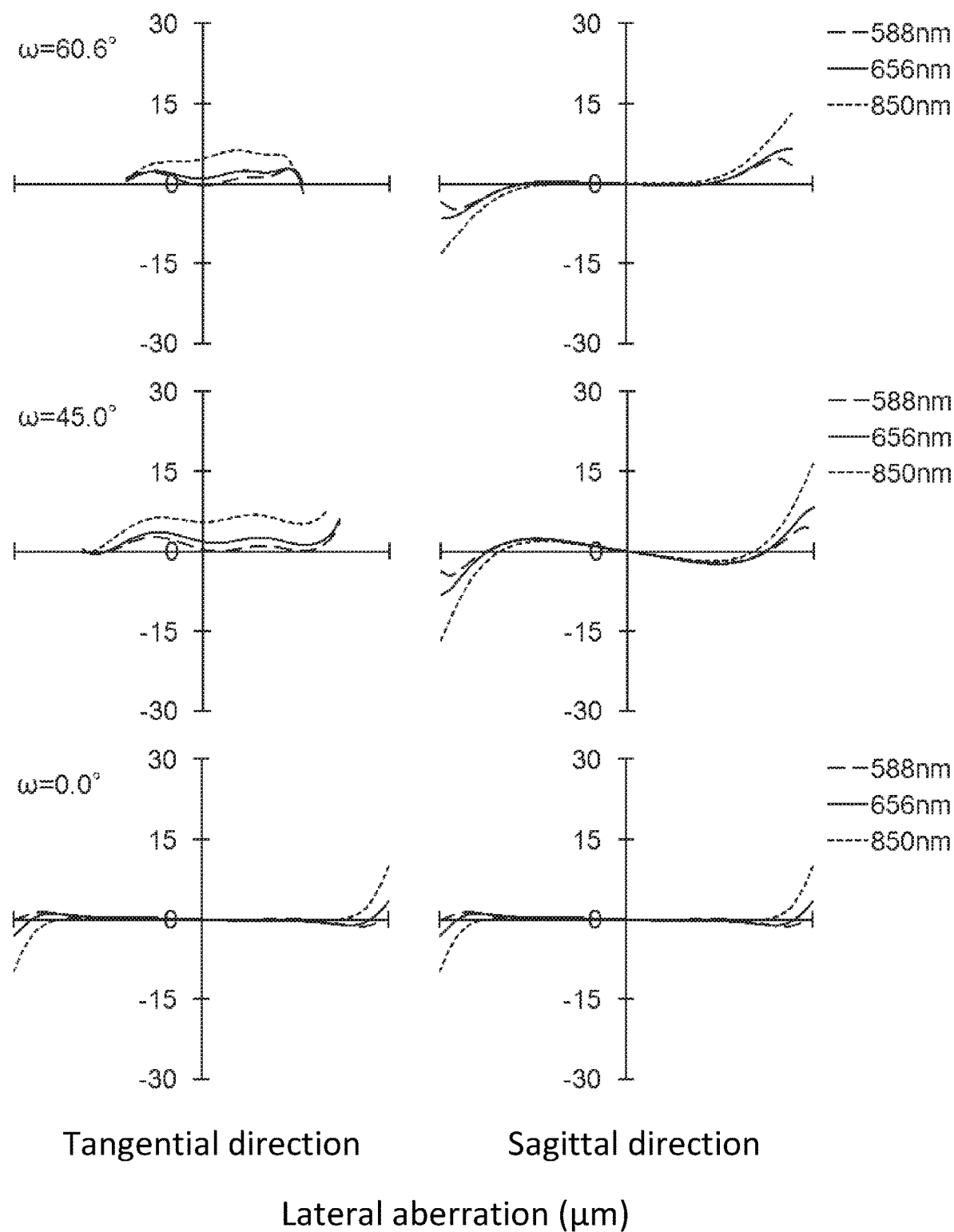
FIG. 5 is an aberration diagram showing a lateral aberration of the imaging lens of FIG. 4.
Figure 6:
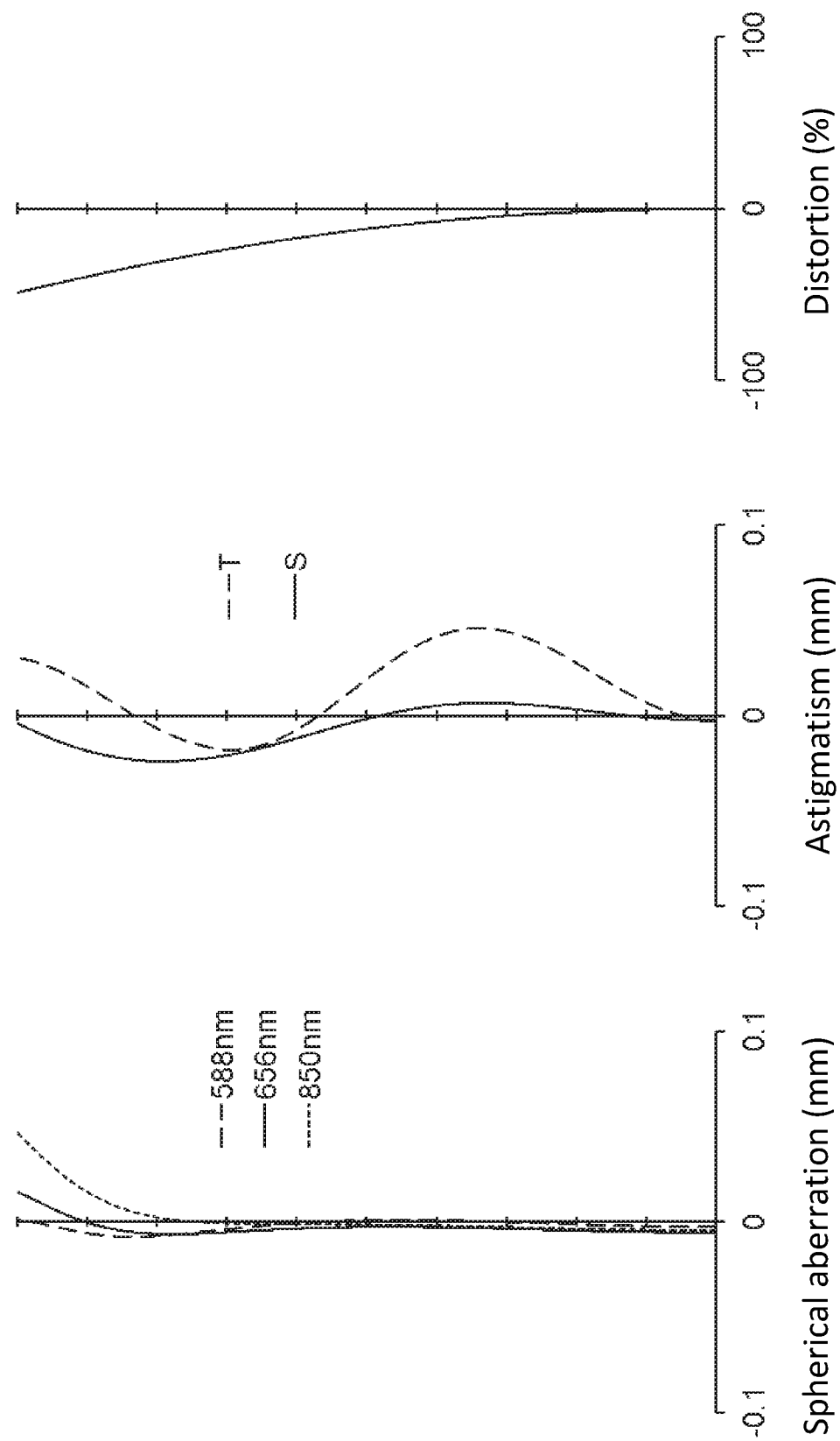
FIG. 6 is an aberration diagram showing a spherical aberration, astigmatism, and a distortion of the imaging lens of FIG. 4.
Figure 7:
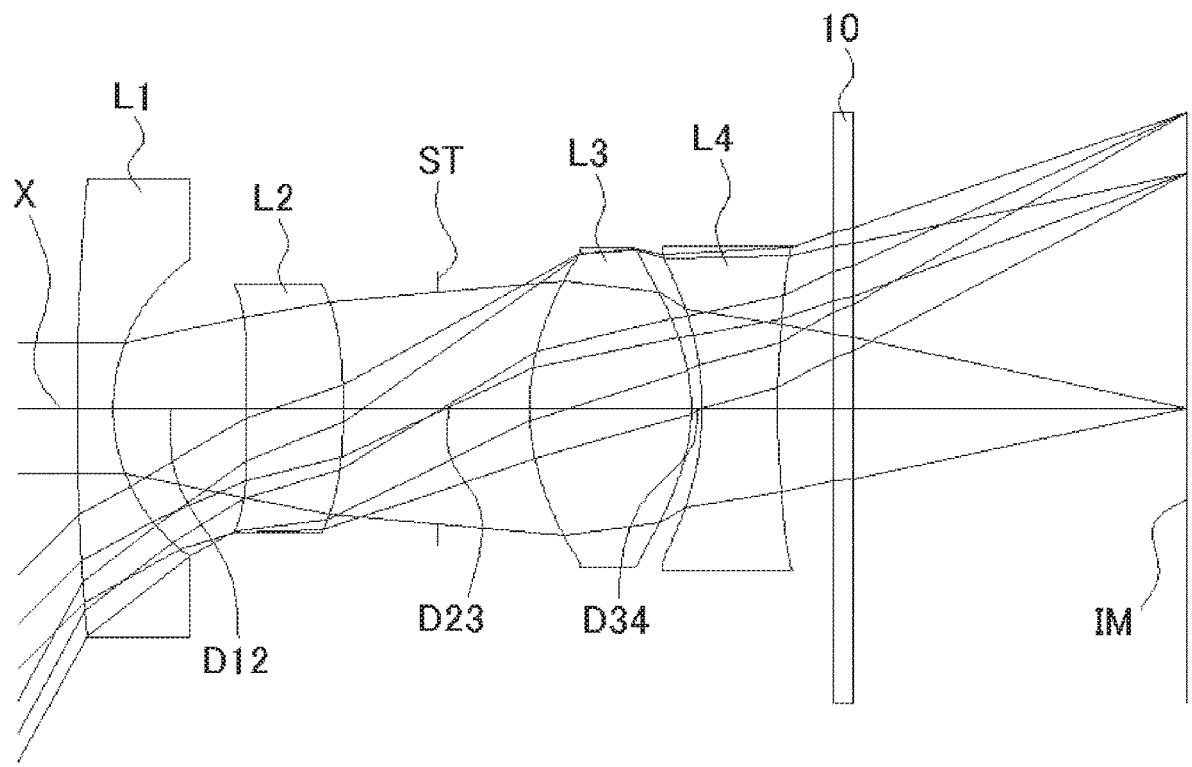
FIG. 7 shows a sectional view of a schematic configuration of an imaging lens in Numerical Data Example 3 of the present invention.

FIG. 5 shows a lateral aberration that corresponds to the half angle of view ω, and FIG. 6 shows the spherical aberration (mm), astigmatism (mm), and the distortion (%), respectively. As shown in FIGS. 5 and 6, according to the imaging lens of Numerical Data Example 2, the aberrations are also satisfactorily corrected.

Numerical Data Example 3

Basic Lens Data

TABLE 5

| | | | f = 3.43 mm Fno = 2.4 ω = 61.3° | | | | |
|---|---|---|---|---|---|---|---|
| | i | r | d | nd | nir | vd | [mm] |
| | | ∞ | ∞ | | | | |
| L1 | 1 | 28.000 | 0.389 | 1.5348 | 1.5274 | 55.7 | f1 = −3.984 |
| | 2 | 1.971 | 1.435 | | | | |
| L2 | 3* | 101.839 | 1.048 | 1.5348 | 1.5274 | 55.7 | f2 = 13.647 |
| | 4* | −7.834 | 1.015 | | | | |
| ST | 5 | ∞ | 0.991 | | | | |
| L3 | 6* | 2.533 | 1.750 | 1.5348 | 1.5274 | 55.7 | f3 = 2.438 |
| | 7* | −2.039 | 0.109 | | | | |
| L4 | 8* | −4.078 | 0.814 | 1.6503 | 1.6291 | 21.5 | f4 = −3.848 |
| | 9* | 6.987 | 0.600 | | | | |
| | 10 | ∞ | 0.210 | 1.5168 | | 64.2 | |
| | 11 | ∞ | 3.612 | | | | |
| (IM) | | ∞ | | | | | |

$T2$=1.048 mm $T3$=1.750 mm $D12$=1.435 mm $D23$=2.006 mm $D34$=0.109 mm $fd$=3.426 mm $fir$=3.429 mm $f12$=−7.145 mm $La$=11.901 mm

TABLE 6

| Aspherical surface data | | | | | |
|---|---|---|---|---|---|
| i | k | A4 | A6 | A8 | A10 |
| 3 | 0 | −3.292E−02 | −6.212E−03 | 6.366E−04 | −2.551E−04 |
| 4 | −3.785E+01 | −4.559E−02 | 1.281E−03 | 5.121E−04 | −1.314E−04 |
| 6 | 0 | −8.737E−03 | −8.015E−04 | 4.828E−04 | −1.575E−04 |
| 7 | −5.635E−01 | 1.666E−02 | 5.997E−03 | −2.079E−03 | 2.052E−04 |
| 8 | 0 | −3.981E−02 | 2.222E−02 | −6.237E−03 | 8.093E−04 |
| 9 | 0 | −3.398E−02 | 1.484E−02 | −3.135E−03 | 3.924E−04 |

The values of the respective conditional expressions are as follows:

$D34/f=0.032$ $D12/D23=0.72$ $f2/f=3.98$ $T2/f=0.31$ $f12/f3=-2.93$ $f3/f4=-0.63$ $fir/fd=1.001$ $T2/T3=0.60$ $La/f=3.47$ Accordingly, the imaging lens of Numerical Data Example 3 satisfies the above-described conditional expressions.

Figure 8:
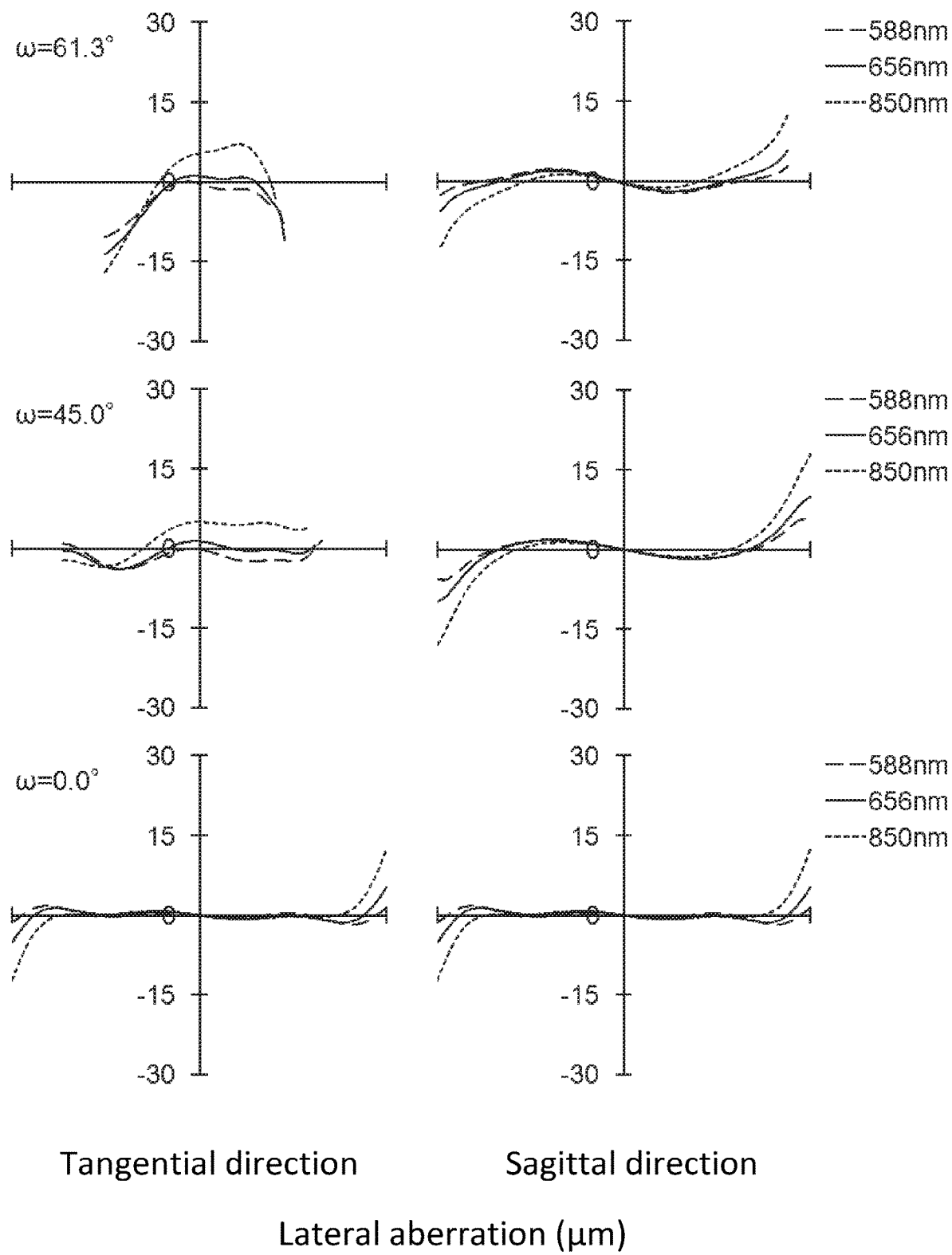
FIG. 8 is an aberration diagram showing a lateral aberration of the imaging lens of FIG. 7.
Figure 9:
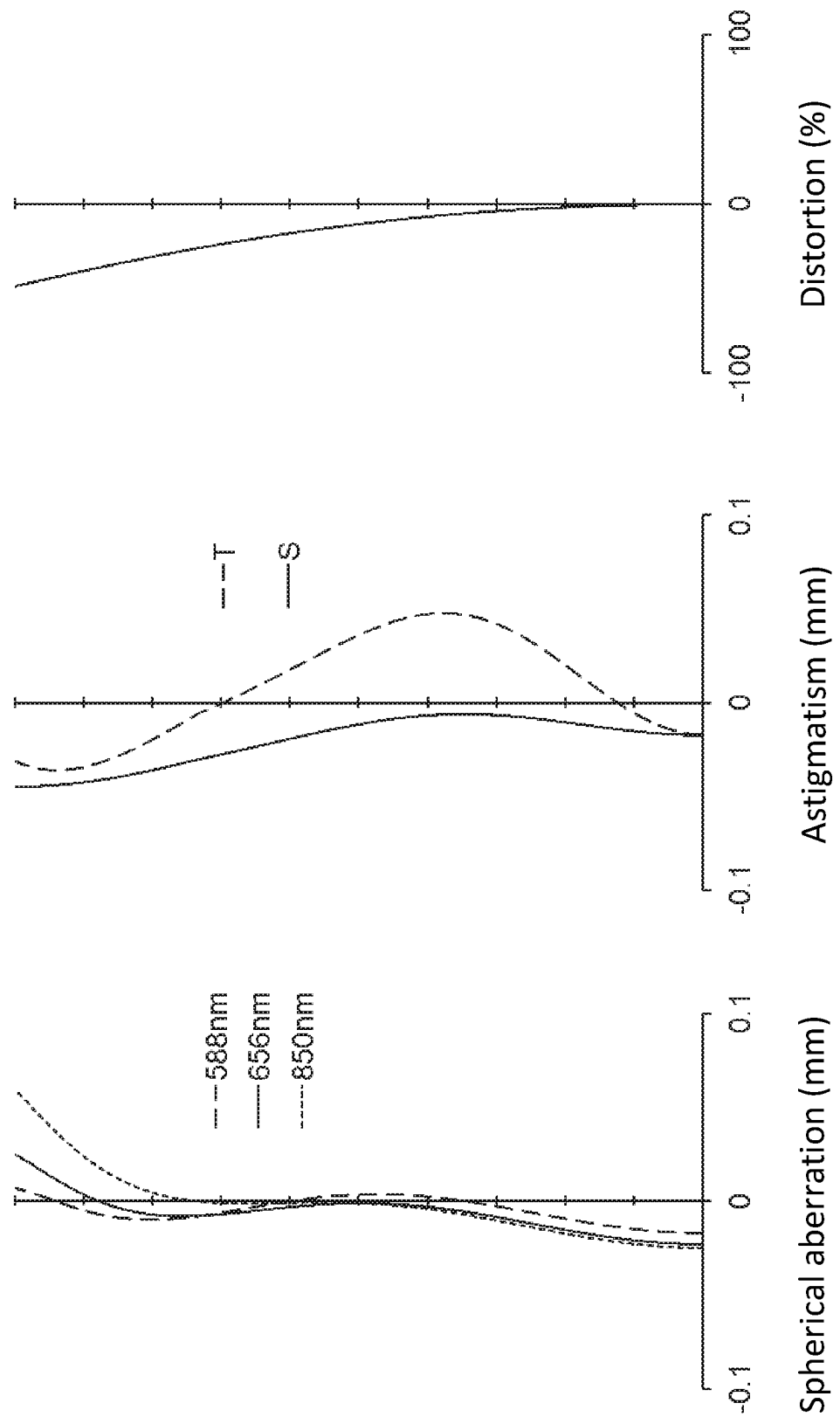
FIG. 9 is an aberration diagram showing a spherical aberration, astigmatism, and a distortion of the imaging lens of FIG. 7.
Figure 10:
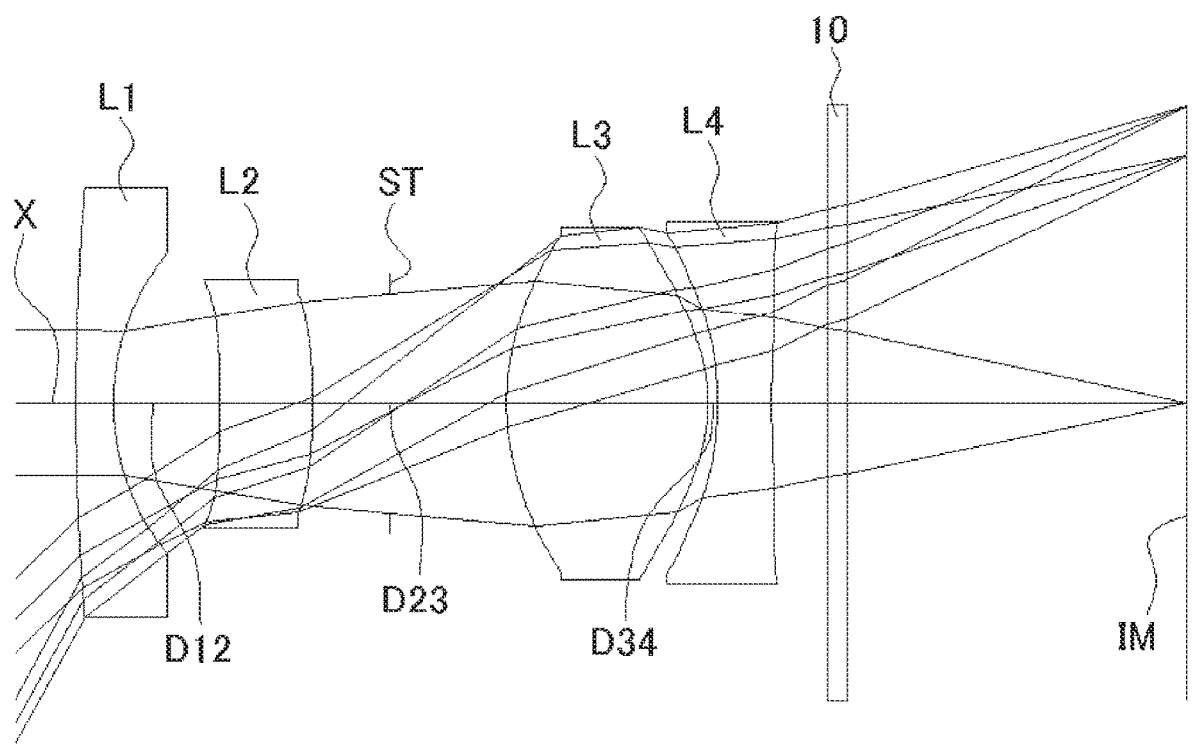
FIG. 10 shows a sectional view of a schematic configuration of an imaging lens in Numerical Data Example 4 of the present invention.

FIG. 8 shows a lateral aberration that corresponds to the half angle of view ω, and FIG. 9 shows the spherical aberration (mm), the astigmatism (mm), and the distortion (%), respectively. As shown in FIGS. 8 and 9, according to the imaging lens of Numerical Data Example 3, the aberrations are also satisfactorily corrected.

Numerical Data Example 4

Basic Lens Data

TABLE 7

| f = 3.79 mm Fno = 2.4 ω = 61.6° | | | | | | | |
|---|---|---|---|---|---|---|---|
| | i | r | d | nd | nir | vd | [mm] |
| L1 | 1 | ∞ | ∞ | | | | |
| | | 28.000 | 0.405 | 1.5348 | 1.5274 | 55.7 | f1 = −5.256 |
| | 2 | 2.511 | 1.139 | | | | |

TABLE 7-continued

| f = 3.79 mm Fno = 2.4 ω = 61.6° | | | | | | | |
|---|---|---|---|---|---|---|---|
| | i | r | d | nd | nir | vd | [mm] |
| L2 | 3* | −34.802 | 1.004 | 1.5348 | 1.5274 | 55.7 | f2 = 21.215 |
| | 4* | −8.642 | 0.838 | | | | |
| ST | 5 | ∞ | 1.244 | | | | |
| L3 | 6* | 2.728 | 2.173 | 1.5348 | 1.5274 | 55.7 | f3 = 2.549 |
| | 7* | −1.969 | 0.100 | | | | |
| L4 | 8* | −4.240 | 0.580 | 1.6503 | 1.6291 | 21.5 | f4 = −4.236 |
| | 9* | 8.291 | 0.600 | | | | |
| | 10 | ∞ | 0.210 | 1.5168 | | 64.2 | |
| | 11 | ∞ | 3.659 | | | | |
| (IM) | | ∞ | | | | | |

$T2=1.004$ mm $T3=2.173$ mm $D12=1.139$ mm $D23=2.082$ mm $D34=0.100$ mm $fd=3.757$ mm $fir=3.760$ mm $f12=-7.971$ mm $La=11.880$ mm

TABLE 8

| Aspherical surface data | | | | | |
|---|---|---|---|---|---|
| i | k | A4 | A6 | A8 | A10 |
| 3 | 0 | −3.307E−02 | −1.178E−02 | 3.989E−03 | −5.379E−04 |
| 4 | −5.466E+01 | −5.053E−02 | 5.178E−03 | −2.016E−04 | −5.003E−05 |
| 6 | 0 | −1.001E−02 | −9.352E−06 | 1.762E−04 | −4.648E−05 |
| 7 | −7.021E−01 | 1.141E−02 | 5.450E−03 | −1.155E−03 | 7.596E−05 |
| 8 | 0 | −5.593E−02 | 2.630E−02 | −5.217E−03 | 4.285E−04 |
| 9 | 0 | −4.742E−02 | 1.710E−02 | −3.012E−03 | 2.609E−04 |

The values of the respective conditional expressions are as follows:

$D34/f=0.027$ $D12/D23=0.55$ $f2/f=5.65$ $T2/f=0.27$ $f12/f3=-3.13$ $f3/f4=-0.60$ $fir/fd=1.001$ $T2/T3=0.46$ $La/f=3.16$ Accordingly, the imaging lens of Numerical Data Example 4 satisfies the above-described conditional expressions.

Figure 11:
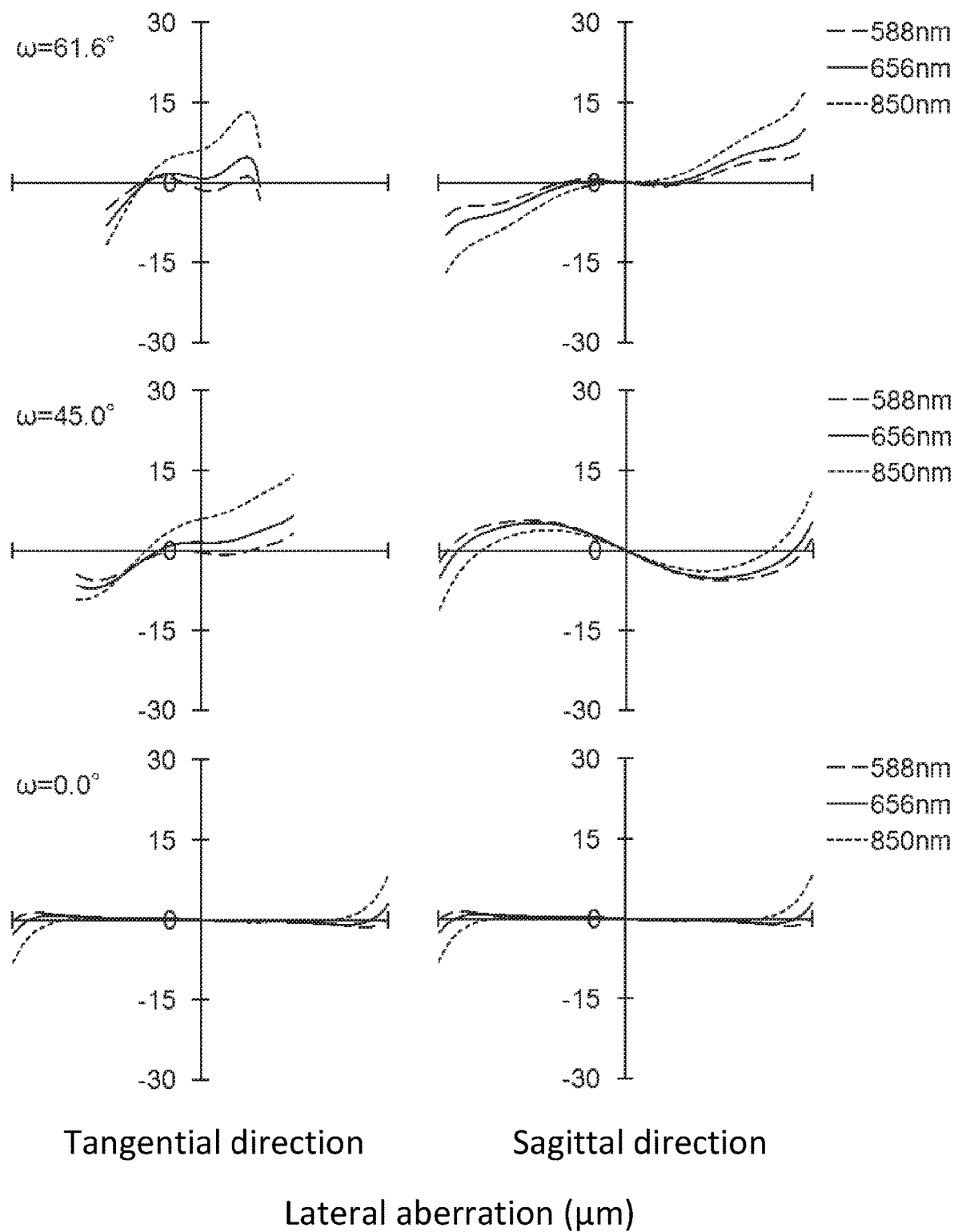
FIG. 11 is an aberration diagram showing a lateral aberration of the imaging lens of FIG. 10.
Figure 12:
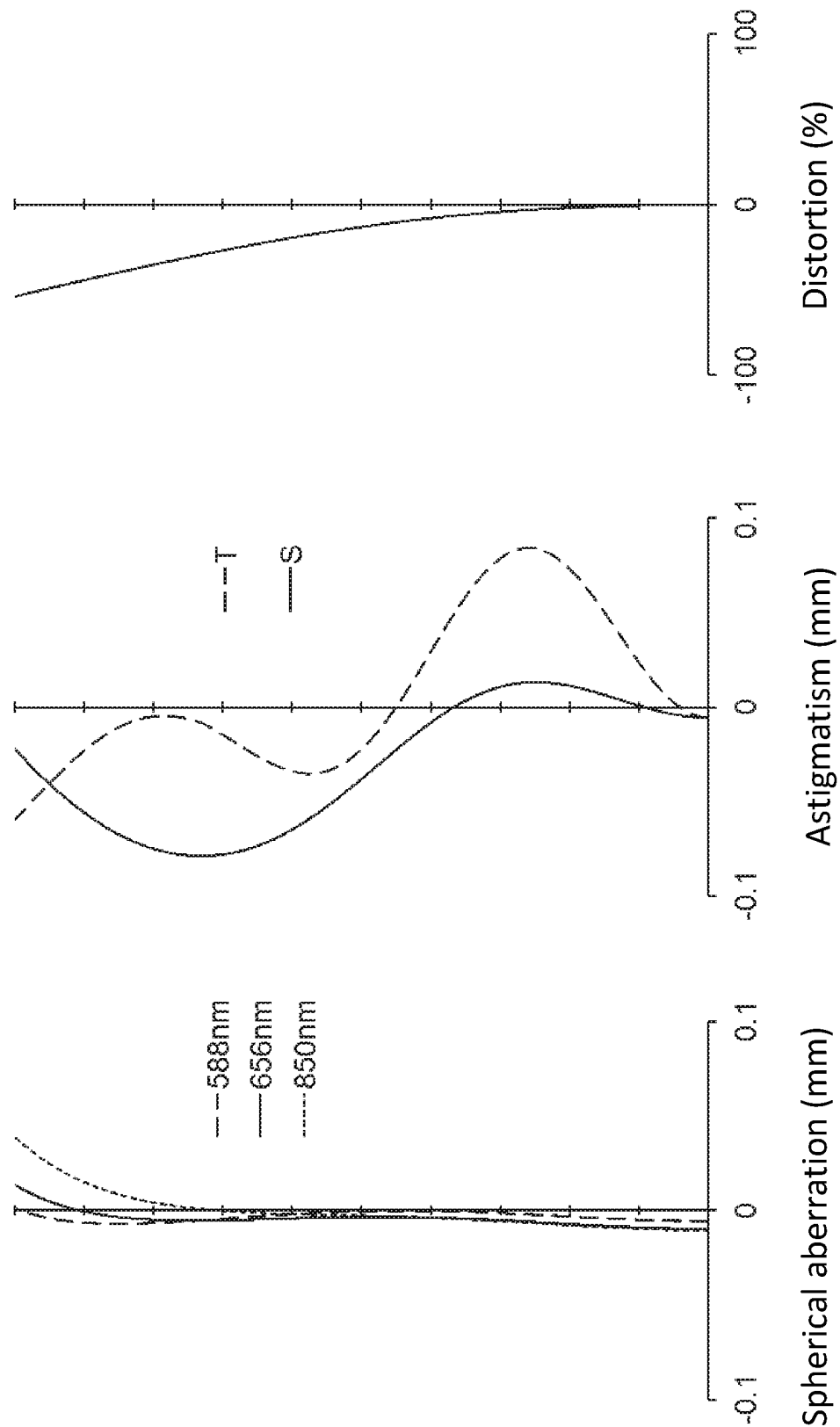
FIG. 12 is an aberration diagram showing a spherical aberration, astigmatism, and a distortion of the imaging lens of FIG. 10.
Figure 13:
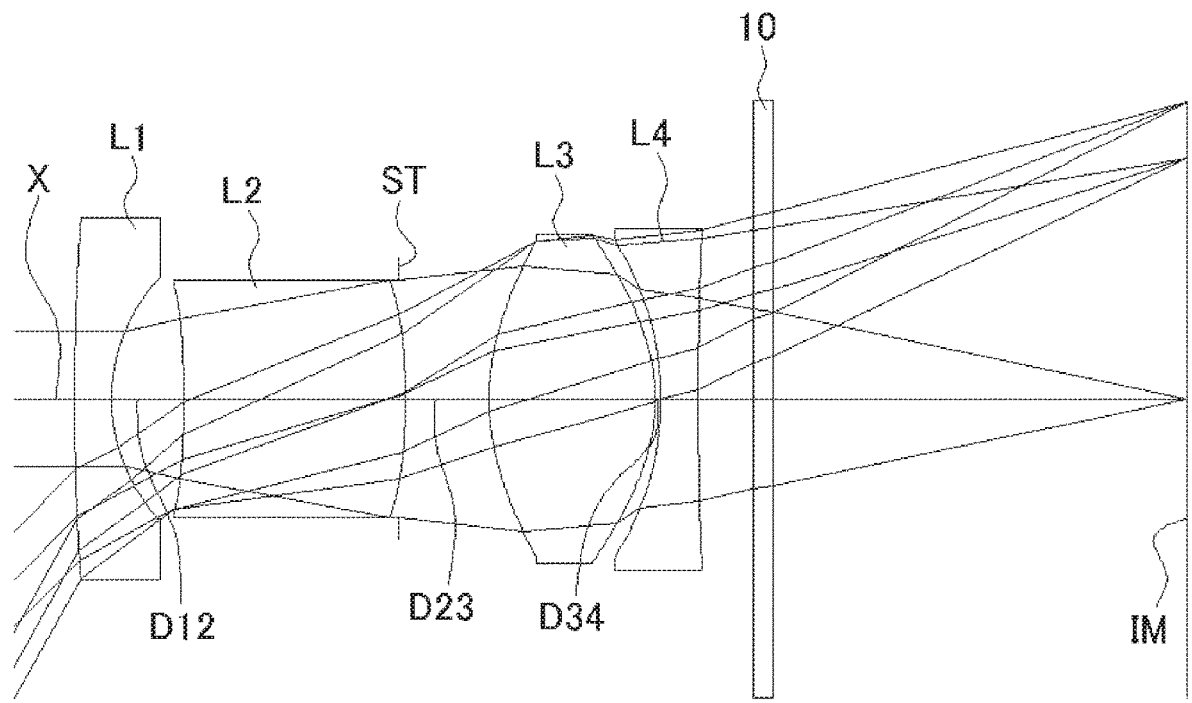
FIG. 13 shows a sectional view of a schematic configuration of an imaging lens in Numerical Data Example 5 of the present invention.

FIG. 11 shows a lateral aberration that corresponds to the half angle of view ω, and FIG. 12 shows the spherical aberration (mm), the astigmatism (mm), and the distortion (%), respectively. As shown in FIGS. 11 and 12, according to the imaging lens of Numerical Data Example 4, the aberrations are also satisfactorily corrected.

Numerical Data Example 5

Basic Lens Data

TABLE 9 f = 3.52 mm Fno = 2.4 ω = 60.6°

| | i | r | d | nd | nir | vd | [mm] |
|---|---|---|---|---|---|---|---|
| | | ∞ | ∞ | | | | |
| L1 | 1 | 28.000 | 0.400 | 1.6348 | 1.5274 | 55.7 | f1 = −3.885 |
| | 2 | 1.925 | 0.775 | | | | |
| L2 | 3* | −17.722 | 2.391 | 1.5348 | 1.5274 | 55.7 | f2 = 28.484 |
| | 4* | −8.577 | −0.072 | | | | |
| ST | 5 | ∞ | 0.971 | | | | |
| L3 | 6* | 2.464 | 1.796 | 1.5348 | 1.5274 | 55.7 | f3 = 2.503 |
| | 7* | −2.187 | 0.057 | | | | |
| L4 | 8* | −4.092 | 0.400 | 1.6503 | 1.6291 | 21.5 | f4 = −4.928 |
| | 9* | 15.353 | 0.600 | | | | |
| | 10 | ∞ | 0.210 | 1.5168 | | 64.2 | |
| | 11 | ∞ | 4.466 | | | | |
| (IM) | | ∞ | | | | | |

$T2=2.391$ mm $T3=1.795$ mm $D12=0.775$ mm $D23=0.899$ mm $D34=0.057$ mm $fd=3.522$ mm $fir=3.531$ mm $f12=-5.251$ mm $La=11.921$ mm

TABLE 10

Aspherical surface data

| i | k | A4 | A6 | A8 | A10 |
|---|---|---|---|---|---|
| 3 | 0 | −2.333E−02 | −2.719E−03 | −1.043E−03 | 4.557E−04 |
| 4 | −3.413E+00 | −4.068E−02 | 1.249E−02 | −4.279E−03 | 1.017E−03 |
| 6 | 0 | −2.686E−02 | 4.886E−03 | −1.143E−03 | 9.301E−05 |
| 7 | −3.143E−01 | −2.124E−03 | 1.218E−02 | −3.392E−03 | 4.003E−04 |
| 8 | 0 | −4.645E−02 | 2.481E−02 | −6.616E−03 | 6.983E−04 |
| 9 | 0 | −2.484E−02 | 1.177E−02 | −2.489E−03 | 2.170E−04 |

The values of the respective conditional expressions are as follows:

$D34/f=0.016$ $D12/D23=0.86$ $f2/f=8.09$ $T2/f=0.68$ $f12/f3=-2.10$ $f3/f4=-0.51$ $fir/fd=1.003$ $T2/T3=1.33$ $La/f=3.39$ Accordingly, the imaging lens of Numerical Data Example 5 satisfies the above-described conditional expressions.

Figure 14:
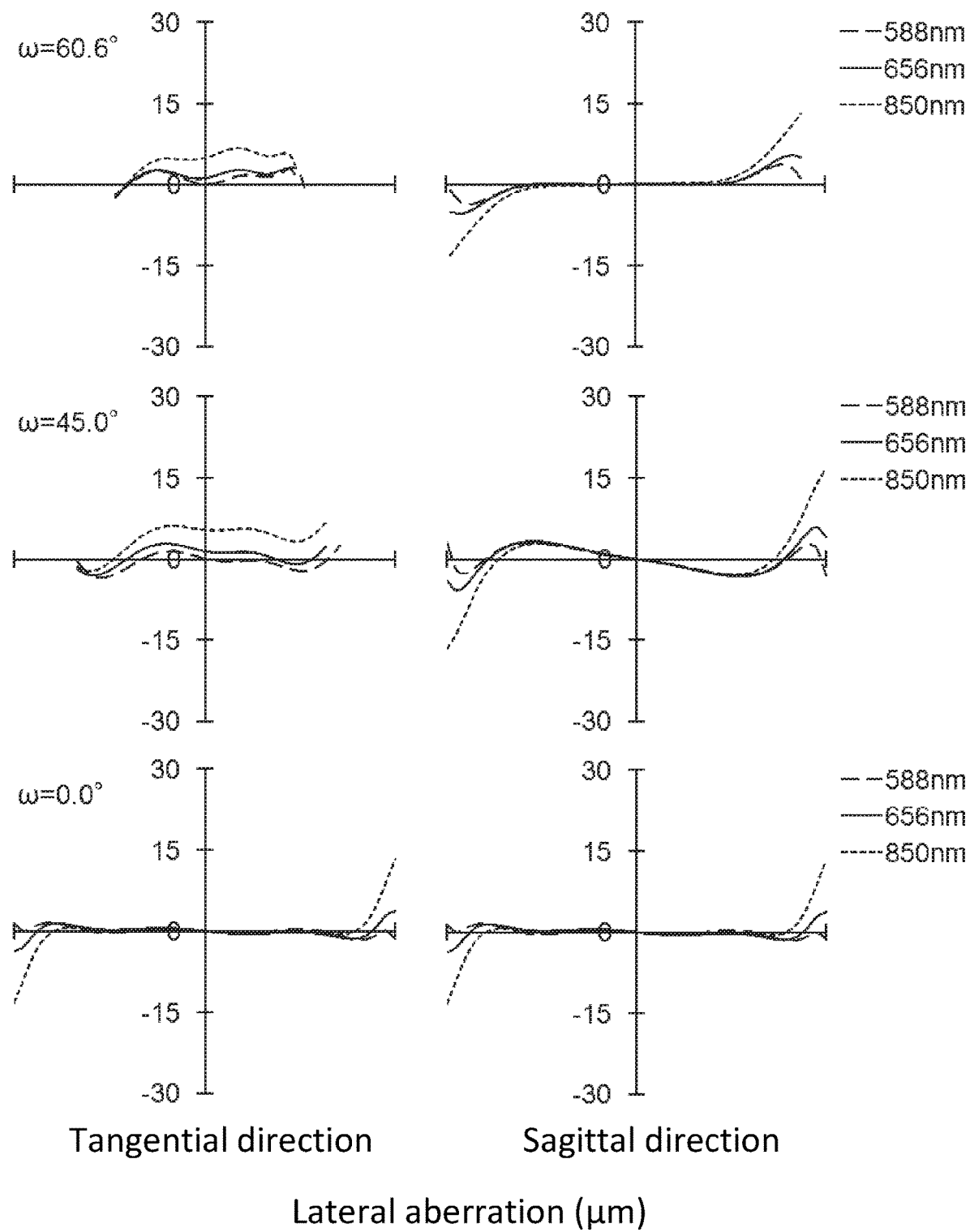
FIG. 14 is an aberration diagram showing a lateral aberration of the imaging lens of FIG. 13.
Figure 15:
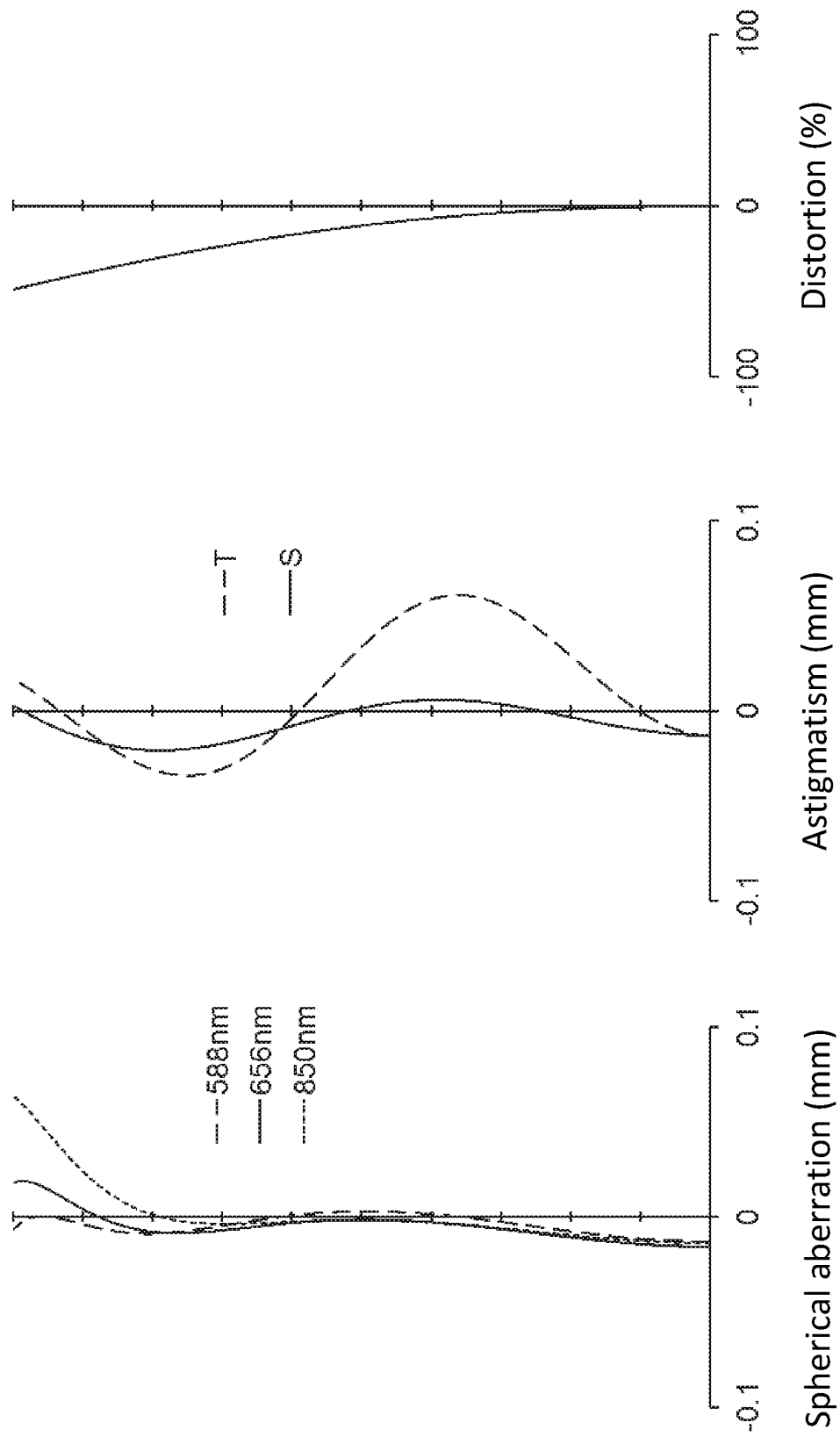
FIG. 15 is an aberration diagram showing a spherical aberration, astigmatism, and a distortion of the imaging lens of FIG. 13.
Figure 16:
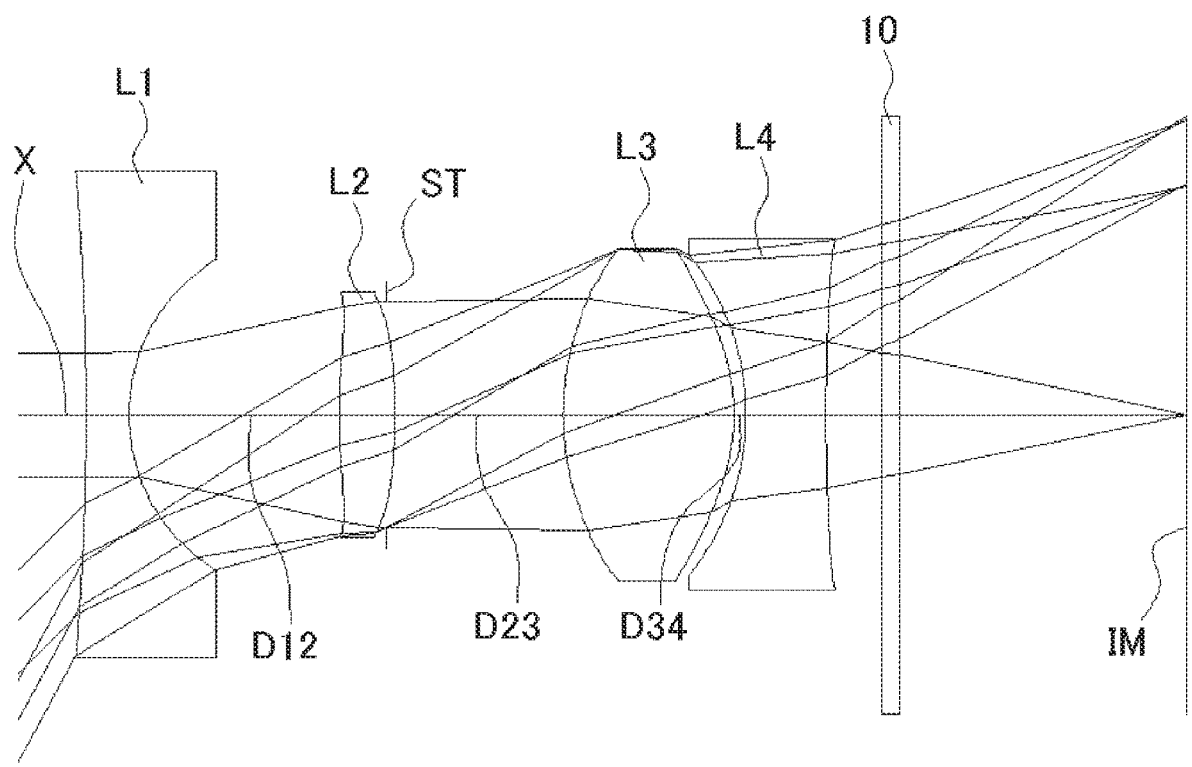
FIG. 16 shows a sectional view of a schematic configuration of an imaging lens in Numerical Data Example 6 of the present invention.

FIG. 14 shows a lateral aberration that corresponds to the half angle of view ω, and FIG. 15 shows the spherical aberration (mm), the astigmatism (mm), and the distortion (%), respectively. As shown in FIGS. 14 and 15, according to the imaging lens of Numerical Data Example 5, the aberrations are also satisfactorily corrected.

Numerical Data Example 6

Basic Lens Data

TABLE 11 f = 3.24 mm Fno = 2.4 ω = 61.3°

| | i | r | d | nd | nir | vd | [mm] |
|---|---|---|---|---|---|---|---|
| | | ∞ | ∞ | | | | |
| L1 | 1 | −31.154 | 0.465 | 1.5348 | 1.5274 | 55.7 | f1 = −3.491 |
| | 2 | 1.996 | 2.286 | | | | |
| L2 | 3* | 6.909 | 0.601 | 1.5348 | 1.5274 | 55.7 | f2 = 6.654 |
| | 4* | −7.115 | −0.090 | | | | |
| ST | 5 | ∞ | 1.916 | | | | |
| L3 | 6* | 2.925 | 1.859 | 1.5348 | 1.5274 | 55.7 | f3 = 2.686 |
| | 7* | −2.197 | 0.128 | | | | |
| L4 | 8* | −3.084 | 0.869 | 1.6503 | 1.6291 | 21.5 | f4 = −3.849 |
| | 9* | 14.770 | 0.600 | | | | |
| | 10 | ∞ | 0.210 | 1.5168 | | 64.2 | |
| | 11 | ∞ | 3.119 | | | | |
| (IM) | | ∞ | | | | | |

$T2$=0.601 mm $T3$=1.859 mm $D12$=2.286 mm $D23$=1.826 mm $D34$=0.128 mm $fd$=3.239 mm $fir$=3.251 mm $f12$=−35.056 mm $La$=11.891 mm

TABLE 12

| | | Aspherical surface data | | | |
|---|---|---|---|---|---|
| i | k | A4 | A6 | A8 | A10 |
| 3 | 0 | −1.302E−02 | −1.768E−02 | 8.406E−03 | −3.089E−03 |
| 4 | −1.636E+03 | −5.754E−02 | 1.053E−02 | −2.752E−03 | −7.154E−04 |
| 6 | 0 | −4.741E−03 | 8.116E−04 | 8.407E−05 | −1.893E−05 |
| 7 | −5.002E−01 | 6.411E−03 | 1.089E−02 | −3.331E−03 | 3.310E−04 |
| 8 | 0 | −3.636E−02 | 2.550E−02 | −8.098E−03 | 9.295E−04 |
| 9 | 0 | −1.909E−02 | 9.479E−03 | −2.048E−03 | 2.057E−04 |

The values of the respective conditional expressions are as follows:

$D34/f$=0.040

$D12/D23$=1.25

$f2/f$=2.05

$T2/f$=0.19

$f12/f3$=−13.05

$f3/f4$=−0.70

$fir/fd$=1.004

$T2/T3$=0.32

$La/f$=3.67

Accordingly, the imaging lens of Numerical Data Example 6 satisfies the above-described conditional expressions.

Figure 17:
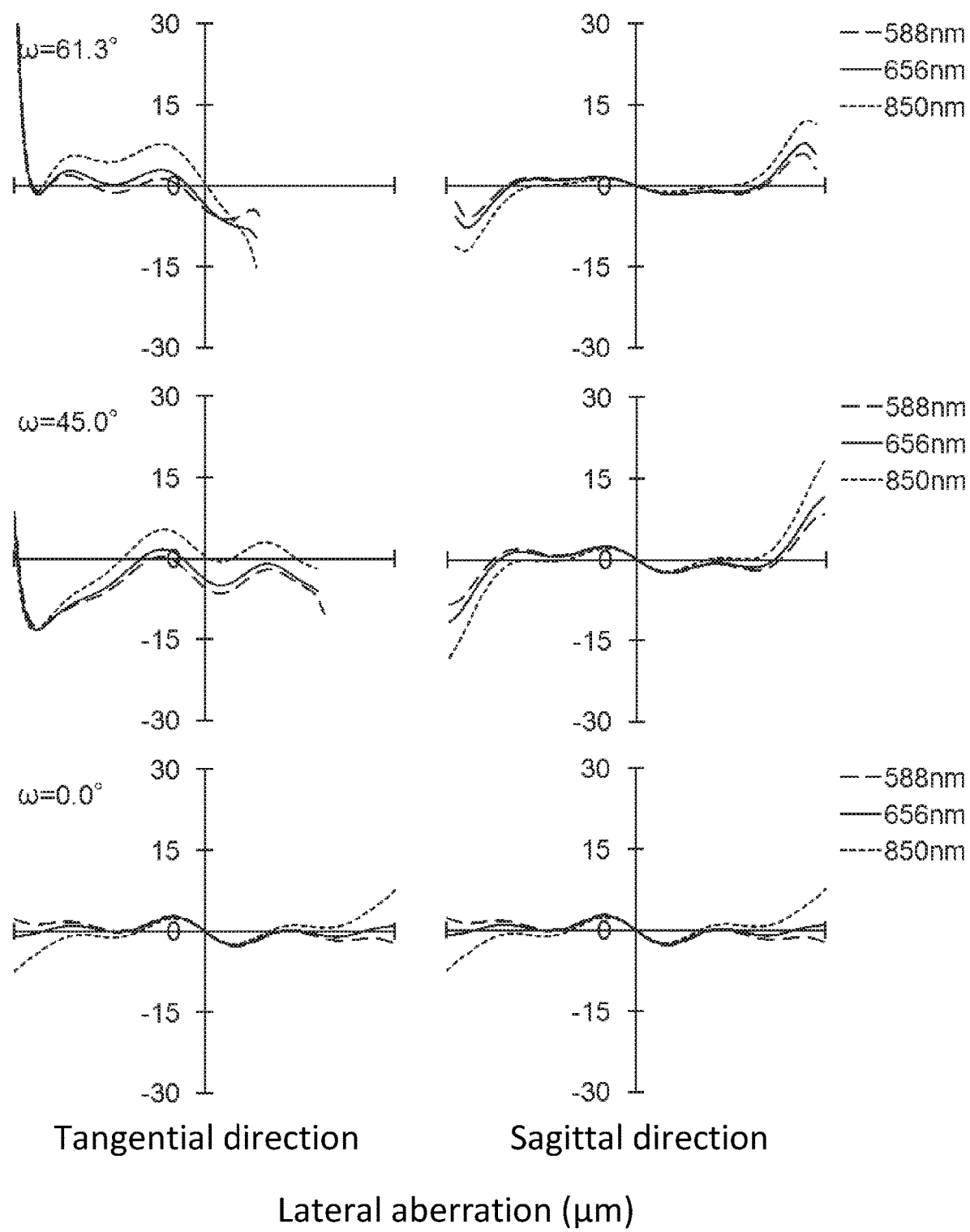
FIG. 17 is an aberration diagram showing a lateral aberration of the imaging lens of FIG. 16.
Figure 18:
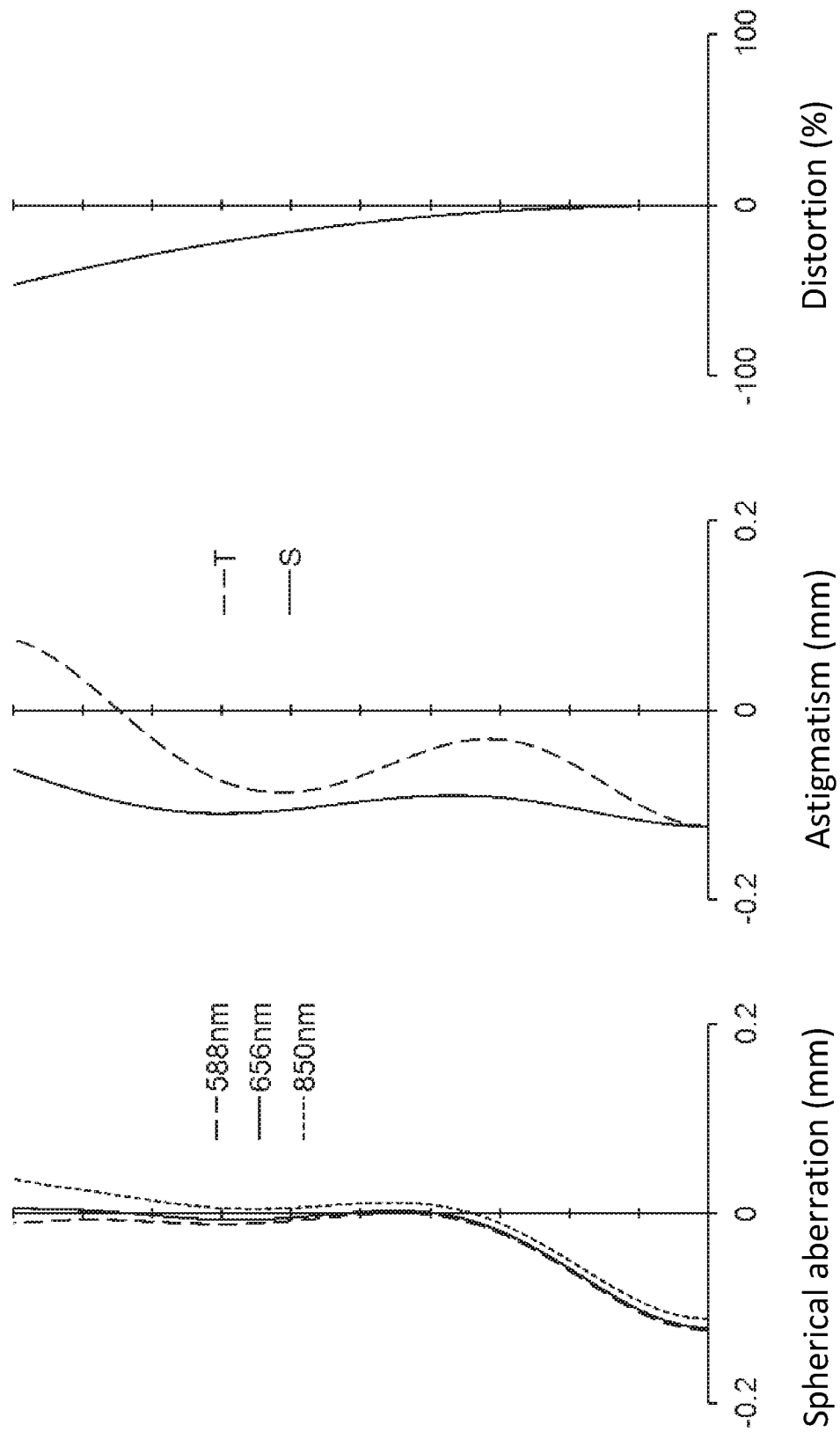
FIG. 18 is an aberration diagram showing a spherical aberration, astigmatism, and a distortion of the imaging lens of FIG. 16.
Figure 19:
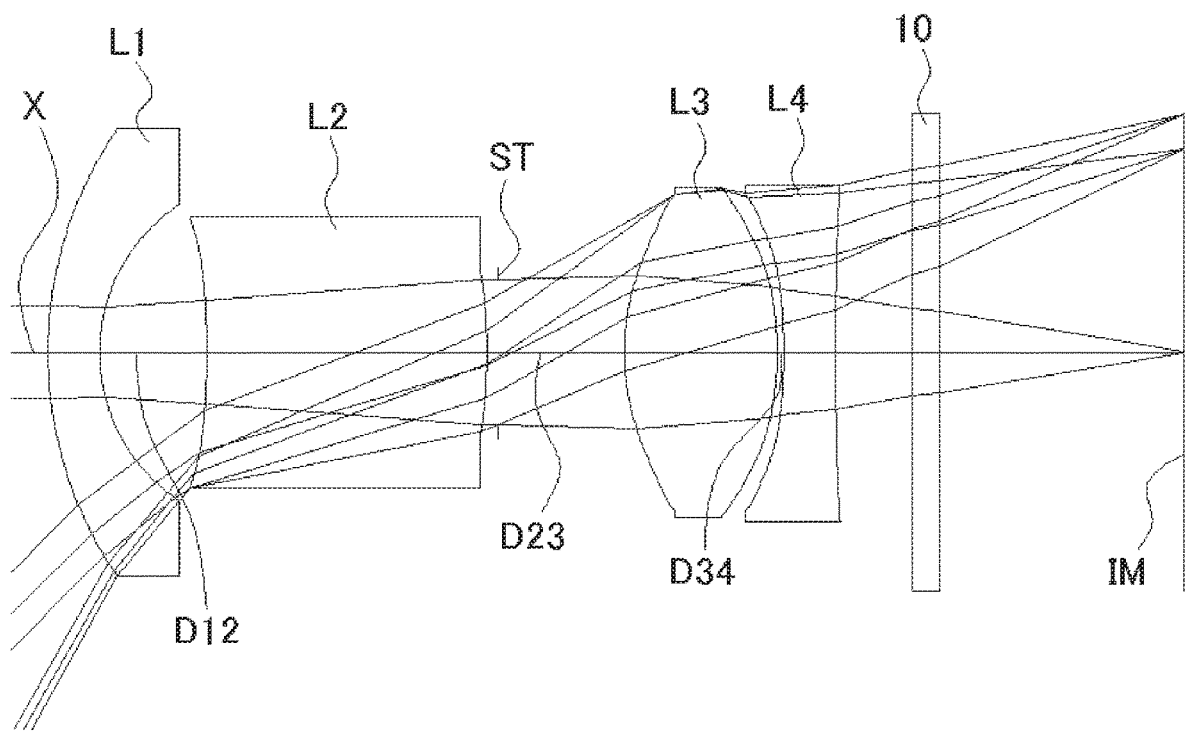
FIG. 19 shows a sectional view of a schematic configuration of an imaging lens in Numerical Data Example 7 of the present invention.

FIG. 17 shows a lateral aberration that corresponds to the half angle of view ω, and FIG. 18 shows the spherical aberration (mm), the astigmatism (mm), and the distortion (%), respectively. As shown in FIGS. 17 and 18, according to the imaging lens of Numerical Data Example 6, the aberrations are also satisfactorily corrected.

Numerical Data Example 7

Basic Lens Data

TABLE 13

| | | | f = 2.17 mm Fno = 3.0 ω = 60.6° | | | | |
|---|---|---|---|---|---|---|---|
| | i | r | d | nd | nir | vd | [mm] |
| | 1 | ∞ | ∞ | | | | |
| L1 | 1 | 3.088 | 0.400 | 1.5348 | 1.5274 | 55.7 | f1 = −5.086 |
| | 2 | 1.381 | 0.827 | | | | |
| L2 | 3* | −7.284 | 2.172 | 1.5348 | 1.5274 | 55.7 | f2 = 20.317 |
| | 4* | −4.814 | 0.088 | | | | |
| ST | 5 | ∞ | 0.981 | | | | |

TABLE 13-continued

| | | | f = 2.17 mm Fno = 3.0 ω = 60.6° | | | | |
|---|---|---|---|---|---|---|---|
| | i | r | d | nd | nir | vd | [mm] |
| L3 | 6* | 1.775 | 1.181 | 1.5348 | 1.5274 | 55.7 | f3 = 2.227 |
| | 7* | −2.781 | 0.050 | | | | |
| L4 | 8* | −5.925 | 0.400 | 1.6503 | 1.6291 | 21.5 | f4 = −7.173 |
| | 9* | 22.508 | 0.600 | | | | |
| | 10 | ∞ | 0.210 | 1.5168 | | 64.2 | |
| | 11 | ∞ | 1.895 | | | | |
| (IM) | | ∞ | | | | | |

$T2$=2.172 mm $T3$=1.181 mm $D12$=0.827 mm $D23$=1.069 mm $D34$=0.050 mm $fd$=2.174 mm $fir$=2.201 mm $f12$=−9.032 mm $La$=8.732 mm

TABLE 14

Aspherical surface data

| i | k | A4 | A6 | A8 | A10 |
|---|---|---|---|---|---|
| 3 | 0 | −3.250E−02 | −8.560E−03 | 1.764E−03 | −1.525E−03 |
| 4 | 5.674E+00 | −3.880E−02 | 1.345E−02 | 1.631E−02 | −6.530E−02 |
| 6 | 0 | −4.063E−02 | −2.792E−03 | −1.631E−03 | 1.357E−04 |
| 7 | 1.369E+00 | −6.472E−02 | 1.315E−02 | 3.065E−03 | 6.413E−04 |
| 8 | 0 | −1.063E−01 | 2.527E−02 | −6.042E−03 | 3.765E−03 |
| 9 | 0 | −5.400E−03 | 3.820E−03 | −1.237E−03 | 4.962E−04 |

The values of the respective conditional expressions are as follows:

$$D34/f=0.023$$

$$D12/D23=0.77$$

$$f2/f=9.35$$

$$T2/f=1.00$$

$$f12/f3=-4.05$$

$$f3/f4=-0.31$$

$$fir/fd=1.012$$

$$T2/T3=1.84$$

$$La/f=4.02$$

Accordingly, the imaging lens of Numerical Data Example 7 satisfies the above-described conditional expressions.

Figure 20:
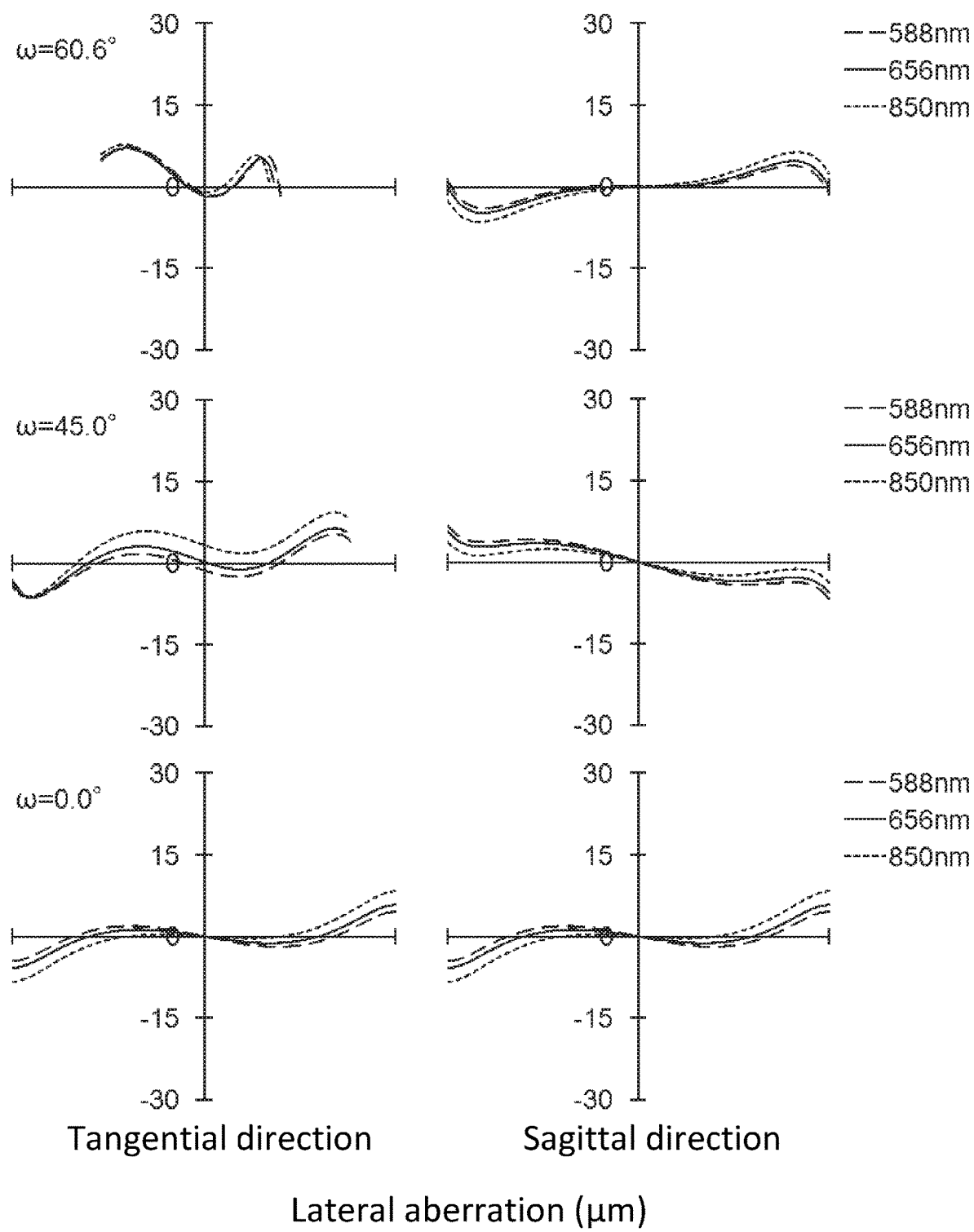
FIG. 20 is an aberration diagram showing a lateral aberration of the imaging lens of FIG. 19.
Figure 21:
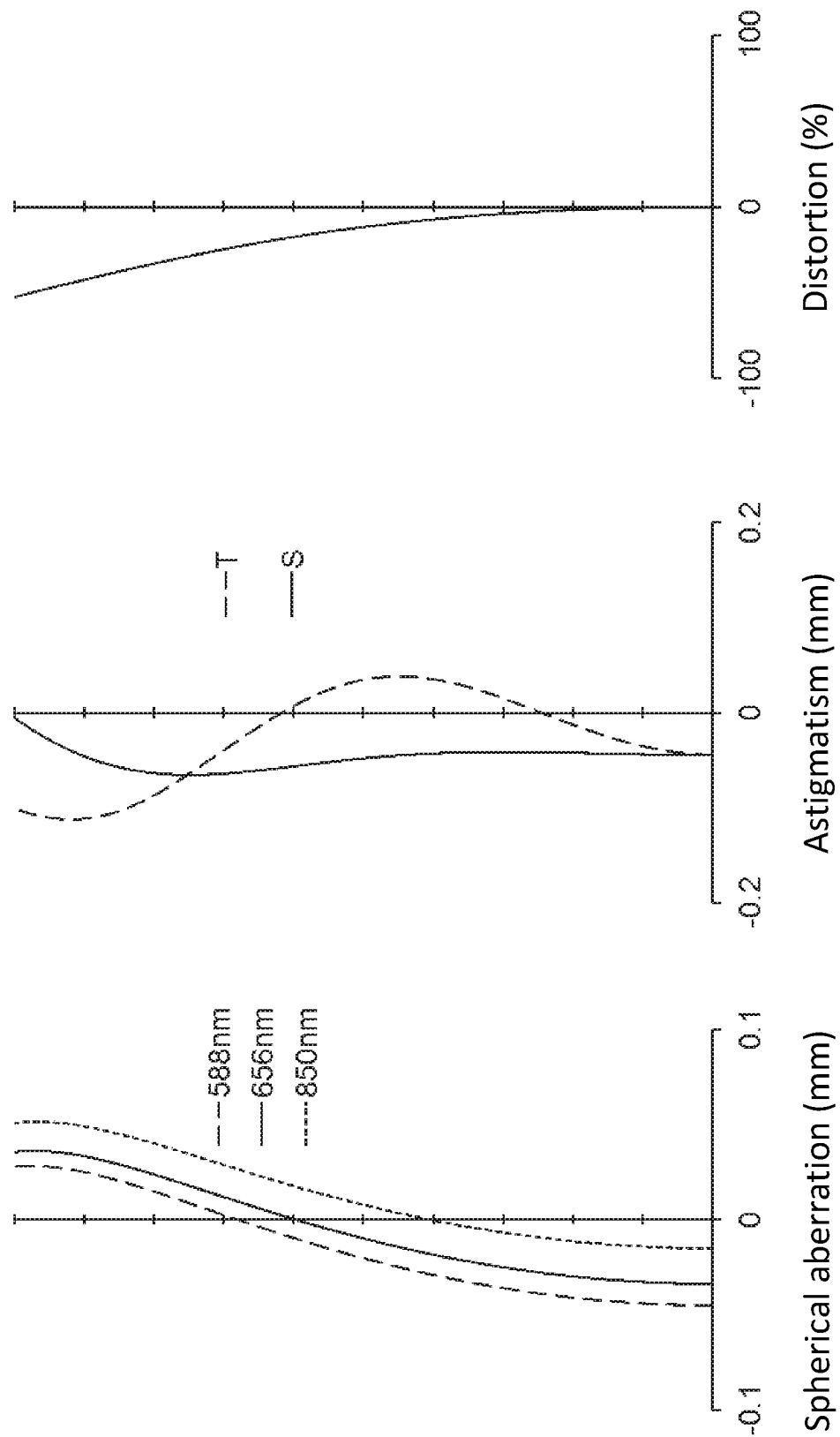
FIG. 21 is an aberration diagram showing a spherical aberration, astigmatism, and a distortion of the imaging lens of FIG. 19.

FIG. 20 shows a lateral aberration that corresponds to the half angle of view ω FIG. 21 shows the spherical aberration (mm), the astigmatism (mm), and the distortion (%), respectively. As shown in FIGS. 20 and 21, according to the imaging lens of Numerical Data Example 7, the aberrations are also satisfactorily corrected.

As described above, according to the imaging lens of the embodiment described above, it is achievable to have very wide angle of view (2ω) of 100° or greater. More specifically, according to Numerical Data Examples 1 to 7, the imaging lenses have wide angles of view of 121.2° to 130°. According to the imaging lens of the embodiment, it is possible to take an image over a wider range than that taken by a conventional imaging lens, while having a small size.

Accordingly, when the imaging lens of the embodiment is mounted in an imaging optical system, such as portable devices including cellular phones and smartphones, digital cameras, digital video cameras, infrared cameras, onboard cameras, network cameras, TV conference cameras, fiberscopes, and capsule endoscopes, it is possible to attain both high performance and downsizing of the cameras.

The present invention is applicable to an imaging lens for mounting in a relatively small camera, such as smartphones and cellular phones, digital cameras, digital video cameras, infrared cameras, onboard cameras, network cameras, TV conference cameras, fiberscopes, and capsule endoscopes.

The disclosure of Japanese Patent Application No. 2017-034330, filed on Feb. 27, 2017, is incorporated in the application by reference.

While the present invention has been explained with reference to the specific embodiment of the present invention, the explanation is illustrative and the present invention is limited only by the appended claims.

What is claimed is:

1. An imaging lens for forming an image on an image plane, comprising:
    a first lens group; and
    a second lens group, arranged in this order from an object side to an image plane side,
    wherein said first lens group includes a first lens having negative refractive power and a second lens,
    said second lens group includes a third lens having positive refractive power and a fourth lens having negative refractive power,
    said fourth lens is formed in a shape so that a curvature radius of a surface thereof on the image plane side is positive, and
    said first lens is arranged so that a surface thereof on the object side is away from the image plane by a distance La on an optical axis, said first lens and said second lens have a composite focal length f12, said third lens has a focal length f3, said first lens has an Abbe's number vd1, said second lens has an Abbe's number vd2, said third lens has an Abbe's number vd3, said first lens is arranged to be away from the second lens by a distance D12 on the optical axis, said second lens is arranged to be away from the third lens by a distance D23 on the optical axis, and said third lens is arranged to be away from the fourth lens by a distance D34 on the optical axis so that the following conditional expressions are satisfied:

$$3.162 \leq La/f < 5.0,$$

$$-15 < f12/f3 \leq -3.127,$$

$$40 < vd1 < 70,$$

$$40 < vd2 < 70,$$

$$40 < vd3 < 70,$$

$$0.2 < D12/D23 < 1.4,$$

$$0.01 < D34/f < 0.1,$$

where f is a focal length of a whole lens system.

2. The imaging lens according to claim 1, wherein said second lens has a focal length f2 so that the following conditional expression is satisfied:

$$1.5 < f2/f < 15.$$

3. The imaging lens according to claim 1, wherein said third lens has a focal length f3 and said fourth lens has a focal length f4 so that the following conditional expression is satisfied:

$$-1 < f3/f4 < -0.1.$$

4. The imaging lens according to claim 1, wherein said whole lens system has a focal length fd at a d line and a focal length fir at a wavelength of 850 nm so that the following conditional expression is satisfied:

$0.9 < fir/fd < 1.1$.

5. An imaging lens for forming an image on an image plane, comprising:
a first lens group having negative refractive power; and
a second lens group, arranged in this order from an object side to an image plane side,
wherein said first lens group includes a first lens having negative refractive power and a second lens,
said second lens is formed in a shape so that a curvature radius of a surface thereof on the object side and a curvature radius of a surface thereof on the image plane side are negative,
said second lens group includes a third lens having positive refractive power and a fourth lens having negative refractive power,
said fourth lens is formed in a shape so that a curvature radius of a surface thereof on the image plane side is positive, and
said first lens is arranged so that a surface thereof on the object side is away from the image plane by a distance La on an optical axis, said third lens is arranged to be away from the fourth lens by a distance D34 on the optical axis, and said second lens has an Abbe's number vd2 so that the following conditional expressions are satisfied:

$3.162 \le La/f < 5.0$, $0.01 < D34/f < 0.1$, $40 < vd2 < 70$, where f is a focal length of a whole lens system.

6. The imaging lens according to claim 5, wherein said second lens has a focal length f2 so that the following conditional expression is satisfied:

$1.5 < f2/f < 15$.

7. The imaging lens according to claim 5, wherein said first lens and said second lens have a composite focal length f12, and said third lens has a focal length f3 so that the following conditional expression is satisfied:

$-15 < f12/f3 < -1$.

8. The imaging lens according to claim 5, wherein said third lens has a focal length f3 and said fourth lens has a focal length f4 so that the following conditional expression is satisfied:

$-1 < f3/f4 < -0.1$.

9. The imaging lens according to claim 5, wherein said whole lens system has a focal length fd at a d line and a focal length fir at a wavelength of 850 nm so that the following conditional expression is satisfied:

$0.9 < fir/fd < 1.1$.

* * * * *